US012223955B2

(12) United States Patent
Weissenberger et al.

(10) Patent No.: US 12,223,955 B2
(45) Date of Patent: Feb. 11, 2025

(54) PROVIDING CERTAIN REASONING WITH RESPECT TO FULFILLMENT OF AN ASSISTANT COMMAND

(71) Applicant: GOOGLE LLC, Mountain View, CA (US)

(72) Inventors: Felix Weissenberger, Zurich (CH); Alexander Froemmgen, Zurich (CH); Bogdan Prisacari, Adliswil (CH)

(73) Assignee: GOOGLE LLC, Mountain View, CA (US)

( * ) Notice: Subject to any disclaimer, the term of this patent is extended or adjusted under 35 U.S.C. 154(b) by 490 days.

(21) Appl. No.: 17/532,759

(22) Filed: Nov. 22, 2021

(65) Prior Publication Data

US 2023/0031461 A1    Feb. 2, 2023

Related U.S. Application Data

(60) Provisional application No. 63/226,961, filed on Jul. 29, 2021.

(51) Int. Cl.
*G10L 15/22* (2006.01)
*G10L 13/08* (2013.01)
*G10L 15/183* (2013.01)

(52) U.S. Cl.
CPC ............... *G10L 15/22* (2013.01); *G10L 13/08* (2013.01); *G10L 15/183* (2013.01); *G10L 2015/223* (2013.01)

(58) Field of Classification Search
CPC ....... G10L 15/22; G10L 13/08; G10L 15/183; G10L 2015/223; G06F 9/453; G06F 3/167
See application file for complete search history.

(56) References Cited

U.S. PATENT DOCUMENTS 10,770,092 B1 * 9/2020 Adams ................... G10L 21/18
10,838,779 B1   11/2020 Yue et al.
(Continued)

FOREIGN PATENT DOCUMENTS

| JP | 2005121526 | 5/2005 |
|----|------------|--------|
| JP | 2007011674 | 1/2007 |
| WO | 2022040547 | 2/2022 |

OTHER PUBLICATIONS

Viros et al. ("Explanation approaches for the Daphne virtual assistant." AIAA Scitech 2020 Forum. 2020. https://arc.aiaa.org/doi/epdf/10.2514/6.2020-2254) (Year: 2020).*

(Continued)

*Primary Examiner* — Pierre Louis Desir
*Assistant Examiner* — Keisha Y. Castillo-Torres
(74) *Attorney, Agent, or Firm* — Gray Ice Higdon

(57) ABSTRACT

Implementations described herein relate to causing certain reasoning with respect to why an automated assistant performed (or did not perform) certain fulfillment and/or alternate fulfillment of an assistant command. For example, implementations can receive user input that includes the assistant command, process the user input to determine data to be utilized in performance of the certain fulfillment or the alternate fulfillment of the assistant command, and cause the automated assistant to utilize the data to perform the certain fulfillment or the alternate fulfillment of the assistant command. In some implementations, output that includes the certain reasoning can be provided for presentation to a user in response to additional user input that requests the certain reasoning. In some implementations, a selectable element can be visually rendered and, when selected by the user, the output that includes the certain reasoning can be provided for presentation to the user.

20 Claims, 9 Drawing Sheets

(56) References Cited

U.S. PATENT DOCUMENTS

| | | | |
|---|---|---|---|
| 10,855,485 B1 * | 12/2020 | Zhou | G06F 16/9535 |
| 11,069,351 B1 | 7/2021 | Menon | |
| 2019/0251083 A1 | 8/2019 | Joshi | |
| 2020/0104746 A1 | 4/2020 | Strope et al. | |
| 2020/0118564 A1 | 4/2020 | Moniz | |
| 2020/0135200 A1 | 4/2020 | Taparia et al. | |
| 2020/0372906 A1 | 11/2020 | Jang et al. | |
| 2020/0394190 A1 * | 12/2020 | Chaudhuri | G06F 16/243 |
| 2021/0125612 A1 | 4/2021 | Coman et al. | |
| 2021/0194716 A1 * | 6/2021 | Peterson | G06F 3/167 |
| 2022/0351720 A1 * | 11/2022 | Alon | G10L 15/285 |

OTHER PUBLICATIONS

European Patent Office; Communication pursuant to Article 94(3) EPC issued in Application No. 21835012.2; 9 pages; dated Apr. 5, 2024.

European Patent Office; International Search Report and Written Opinion issued in Application No. PCT/US2021/060986 ; 18 pages; dated Apr. 26, 2022.

Tanner MC et al.; Explanations in knowledge systems: the roles of the task structure and domain functional models; IEEE; vol. 6, No., 3; 8 pages; dated Jun. 1, 1991.

Japanese Patent Office; Notice of Refusal issued in Application No. 2023-537164; 12 pages; dated Oct. 15, 2024.

\* cited by examiner

PROVIDING CERTAIN REASONING WITH RESPECT TO FULFILLMENT OF AN ASSISTANT COMMAND

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) to an automated assistant, which may in some cases be converted into text and then processed, and/or by providing textual (e.g., typed) natural language input or touch input. An automated assistant generally responds to these user inputs that include assistant commands by providing responsive user interface output (e.g., audible and/or visual user interface output), controlling smart networked device(s), and/or performing other action(s).

Automated assistants typically rely upon a pipeline of components in interpreting and responding to these user inputs that include assistant commands. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain responsive content to the spoken utterance and/or to perform an action responsive to the spoken utterance.

In some cases, users may not understand why an automated assistant provides particular responsive content and/or performs a particular action in response to receiving these user inputs that include assistant commands. This misunderstanding can be exacerbated when the automated assistant does not provide the particular responsive content and/or perform the particular action that these users intended in providing the user inputs. For example, if a given user provides user input directed to an automated assistant that requests the automated assistant cause music to be played, but the automated assistant provides causes music to be played using an undesired software application or causes search results to be provided responsive to the user input, the given user may be confused as to why the automated assistant did not cause music to be played in a desired manner. As a result, the given user may provide additional user input that includes another instance of the same user input or other user input to cause the music to be played using a desired software application, thereby prolonging a duration of a human-to-computer dialog between the given user and the automated assistant. Moreover, even if the automated assistant did cause the music to be played using the desired software application, the given user may be apprehensive of the automated assistant because the user may not be aware of how the automated assistant was able to cause the music to be played using the desired software application and may have concerns about security of his/her data. Accordingly, it may be beneficial to provide a mechanism for the given user to understand why the automated assistant causes certain fulfillment of assistant commands to be performed.

SUMMARY

Implementations disclosed herein are directed to causing certain reasoning with respect to why an automated assistant performed (or did not perform) certain fulfillment and/or alternate fulfillment of an assistant command. For example, implementations can receive user input that includes the assistant command, process the user input to determine data to be utilized in performance of the certain fulfillment or the alternate fulfillment of the assistant command, and cause the automated assistant to utilize the data to perform the certain fulfillment or the alternate fulfillment of the assistant command. In some implementations, output that includes the certain reasoning can be provided for presentation to a user in response to additional user input that requests the certain reasoning. In some implementations, one or more selectable elements can be visually rendered and, when a given one of the one or more selectable elements is selected by the user, the output that includes the certain reasoning can be provided for presentation to the user.

For example, assume a user of a client device provides a spoken utterance of "play rock music". In this example, the automated assistant can cause audio data capturing the spoken utterance to be processed, using automatic speech recognition (ASR) model(s), to generate ASR output, such as speech hypotheses that are predicted to correspond to the spoken utterance, predicted phonemes that are predicted to correspond to the spoken utterance, and/or other ASR output and optionally ASR metrics associated with each of the speech hypotheses, the predicted phonemes, and/or the other ASR output (e.g., that are indicative of a likelihood a given speech hypothesis or given predicted phoneme correspond to the spoken utterance). Further, the automated assistant can cause the ASR output to be processed, using natural language understanding (NLU) model(s), to generate NLU output, such as one or more predicted intents of the user in providing the spoken utterance, one or more slot values for corresponding parameters associated with each of the one or more predicted intents, and/or other NLU output and optionally NLU metrics associated with each of the intents, slot values, and/or the other NLU output (e.g., that are indicative of a likelihood a given intent and/or given slot values correspond to an actual intent and/or desired slot values in providing the spoken utterance). In this example, the automated assistant can infer one or more slot values since the user only specified a particular genre of music (e.g., rock), such as an artist slot value for an artist parameter associated with a music intent, a song slot value for a song parameter associated with the music intent, a software application or streaming service slot value for a software application or streaming service parameter associated with the music intent, etc. Variations for the inferred slot values can result in one or more interpretations of the spoken utterance. In various implementations, and assuming the automated assistant has access to one or more user profiles of the user of the client device, the automated assistant can leverage user profile data in inferring one or more of the slot values. Otherwise, the automated assistant may utilize one or more default slot values.

Moreover, the automated assistant can cause the NLU output to be processed, using one or more fulfillment rule(s) and/or fulfillment model(s), to generate fulfillment output, such as one or more structured requests to be transmitted to one or more fulfillers (e.g., software application(s), server(s), etc.) that are capable of satisfying the spoken utterance. In transmitting the one or more structured requests, the one or more fulfillers can generate one or more fulfillment candidates, and transmit the one or more fulfillment candidates back to the automated assistant. The automated assistant can generate fulfillment metrics associated with each of the one or more fulfillment candidates in response to the one or more fulfillment candidates being received based on user profile data assuming the automated assistant has access to one or more user profiles of the user of the client device (e.g., that are indicative of a likelihood a given fulfillment candidate of the one or more fulfillment candidates will satisfy the spoken utterance if implemented). The automated assistant can rank the one or more fulfillment candidates based on the ASR metrics, the NLU metrics, and/or the fulfillment metrics, and select a certain fulfillment candidate based on the ranking. Further, the automated assistant can cause the selected certain fulfillment candidate to be implemented in an attempt to satisfy the spoken utterance.

For instance, in this example, assume the automated assistant determined a first interpretation of the spoken utterance of "play rock music" that includes a music intent having an artist slot value of "artist 1" for an artist parameter associated with the music intent, a song slot value of "song 1" for a song parameter associated with the music intent, a software application or streaming service slot value of "application 1" for a software application or streaming service parameter associated with the music intent. Further assume the automated assistant determined a first interpretation of the spoken utterance of "play rock music" that includes the music intent having an artist slot value of "artist 1" for an artist parameter associated with the music intent, a song slot value of "song 1" for a song parameter associated with the music intent, a software application or streaming service slot value of "application 2" for a software application or streaming service parameter associated with the music intent. In this instance, "application 1" and "application 2" can be considered the one or more fulfillers that are capable of satisfying the spoken utterance. Accordingly, the automated assistant can transmit one or more structured requests to "application 1" and "application 2" (and optionally other fulfillers that are capable of satisfying the spoken utterance) to obtain one or more fulfillment candidates. Further, the automated assistant can rank the one or more fulfillment candidates and select a certain fulfillment candidate to cause certain fulfillment to be performed responsive to the spoken utterance. In this example, further assume the automated assistant selects a fulfillment candidate associated with the first interpretation. Accordingly, the automated assistant can cause "song 1" by "artist 1" to be played using "application 1" via speaker(s) of the client device (or an additional client device in communication with the client device) as certain fulfillment of the spoken utterance.

In some implementations, and subsequent to the automated assistant causing the certain fulfillment to be performed, the user of the client device may provide additional user input that requests the automated assistant provide the certain reasoning with respect to why the certain fulfillment was performed and/or why alternate fulfillment was not performed. In some versions of these implementations, the request for the certain reasoning may be a general request for the certain reasoning (e.g., "why did you do that?"), whereas in other implementations, the request for the certain reasoning may be a particular request for the certain reasoning (e.g., "why did you play the music using application 1?", "why didn't you use application 2?", "why did you select artist 1?", etc.). For example, assume the user provides a further spoken utterance of "why did you do that?". In this example, the request is general request for the certain reasoning, and the automated assistant can determine additional data associated with the first interpretation of the spoken utterance to generate output that is responsive to the general request (e.g., "You use application 1 the most to listen to music, you have listened to artist 1 in the past, and song 1 is artist 1's most popular song" or the like). In contrast, assume the user provides a further spoken utterance of "why didn't you use application 2?". In this example, the request is particular request for the certain reasoning, and the automated assistant can determine additional data associated with the first interpretation and/or the second interpretation of the spoken utterance to generate output that is responsive to the general request (e.g., "You use application 1 more than application 2 to listen to music" or the like). However, in this example with the particular request, assume the user has not granted the automated assistant access to "application 2". In this example, the automated assistant can additionally or alternatively determine recommendation data that is associated with a recommended action, and generate a prompt based on the recommendation data that includes the recommended action (e.g., "You have not granted me access to use application 2, would you like to grant me access?" or the like). Accordingly, the automated assistant may not only provide the certain reasoning with respect to certain aspects of fulfillment, but the automated assistant may also prompt the user to adapt current and/or future fulfillment in response to receiving user input that includes the assistant command.

In additional or alternative implementations, and subsequent to the automated assistant causing the certain fulfillment to be performed, the automated assistant may proactively cause one or more selectable elements associated with the certain reasoning to be provided for presentation to the user via a display of the client device. For example, a first selectable element associated with a general request for the certain reasoning can be provided for presentation to the user, and, when selected, can cause the automated assistant to provide the certain reasoning responsive to the general request. Further, a second selectable element associated with a first particular request for the certain reasoning can additionally or alternatively be provided for presentation to the user, and, when selected, can cause the automated assistant to provide the certain reasoning responsive to the first particular request. Moreover, a third selectable element associated with a second particular request for the certain reasoning can additionally or alternatively be provided for presentation to the user, and, when selected, can cause the automated assistant to provide the certain reasoning responsive to the second particular request. In some versions of those implementations, the automated assistant can cause the one or more selectable elements to be provided for presentation to the user in response to determining the ASR metrics, NLU metrics, and/or fulfillment metrics fail to satisfy a threshold that indicates the automated assistant is not highly confident in the certain fulfillment of the assistant command. In some versions of those implementations, the automated assistant can cause the one or more selectable elements to be provided for presentation to the user regardless of the ASR metrics, NLU metrics, and/or fulfillment metrics.

Although the above examples are described with respect to providing certain reasoning with respect to why the automated assistant selected a particular software application to cause music to be played (e.g., "application 1"), it should be understood that is for the sake of example and is not meant to be limiting. As described herein, the techniques described herein can be utilized to provide certain reasoning with respect to any aspect of fulfillment, such as why a particular computing device was selected to be utilized in fulfillment of an assistant command, why a particular slot value for a corresponding parameter was selected, why the automated assistant could not perform alternate fulfillment, and/or any other aspect described herein. Moreover, although the recommended action described in the above examples includes the user granting the automated assistant access to a particular software application (e.g., "application 2"), it should be understood that is also for the sake of example and is not meant to be limiting. The techniques described herein can be utilized to provide any recommended action to adapt fulfillment of assistant commands, such as downloading software applications at the client device, communicatively coupling additional client devices with the client device over network(s), and/or any other recommended action described herein.

By using techniques described herein, one or more technical advantages can be achieved. As one non-limiting example, the techniques described herein enable the automated assistant to provide certain reasoning for certain aspects of fulfillment (or lack thereof), thereby providing the user of the client device to understand when his/her data is being utilized and how the his/her data is being utilized by providing the certain reasoning. Further, the techniques described herein enable the automated assistant to quickly and efficiently adapt privacy settings of user data, and reduce a quantity of user inputs by obviating the need for the user to have to manually change the privacy settings of the user data by navigating through various interfaces. As a result, security of user data is increased and computational resources of the client device can be conserved. As another non-limiting example, by providing the recommended actions to be performed and continuing with the human-to-computer dialog, the automated assistant can salvage user interactions that would otherwise be wasted. For instance, if a user provides a spoken utterance of "turn on the lights" to cause one or more smart lights to be controlled, but the user has not granted the automated assistant access to a software application for controlling the smart lights, then the automated assistant can prompt the user to grant access to the software application for controlling the smart lights, rather than simply indicating that the automated assistant cannot cause the lights to be controlled at this particular instance in time. As a result, computational and/or network resources can be conserved using the techniques described herein.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
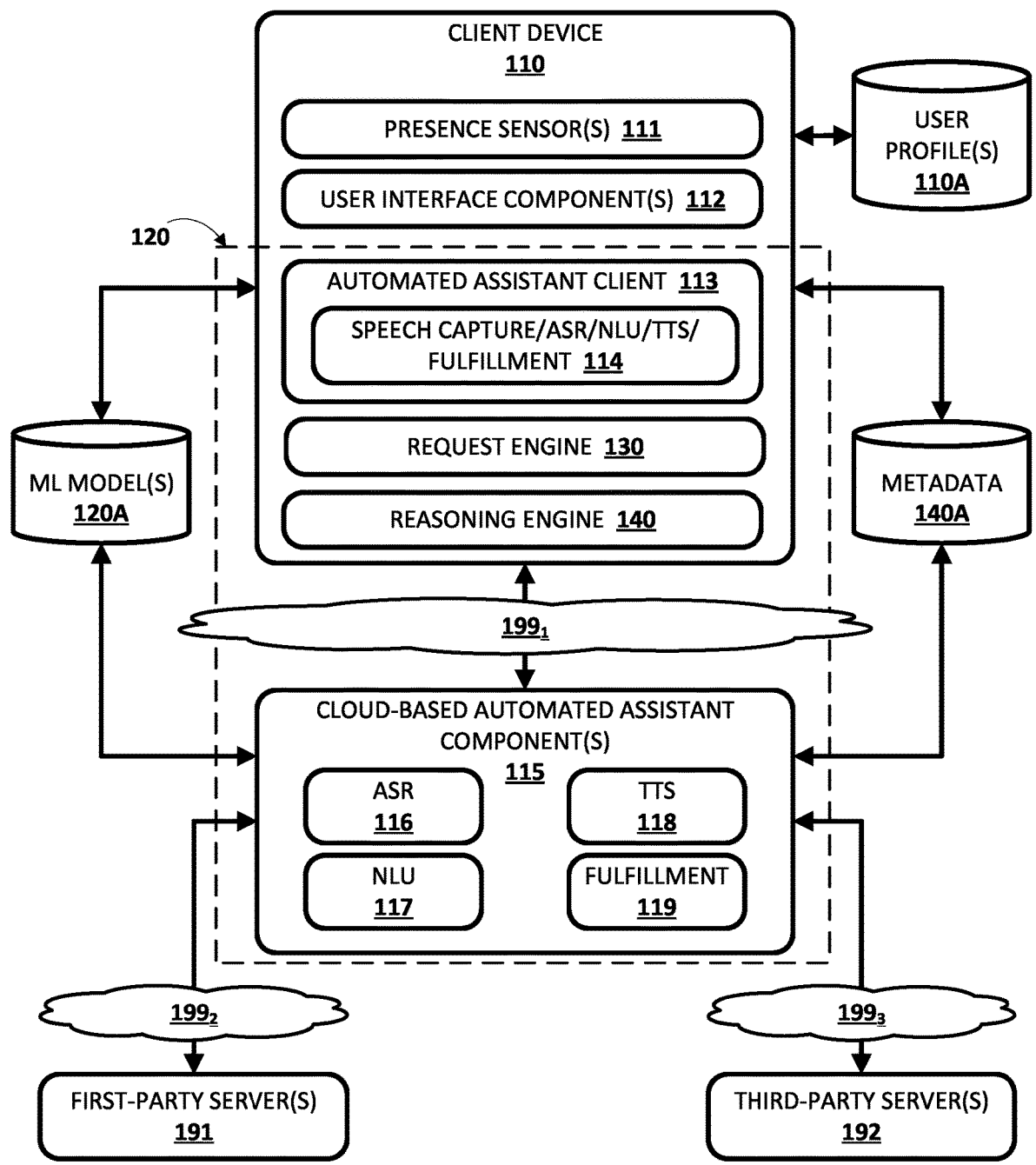
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, one or more cloud-based automated assistant components 115, one or more first-party servers 191, and one or more third-party servers 192.

The client device 110 can execute an automated assistant client 113. The automated assistant client 113 can be an application that is separate from an operating system of the client device 110 (e.g., installed "on top" of the operating system)—or can alternatively be implemented directly by the operating system of the client device 110. As described further below, the automated assistant client 113 can optionally interact with one or more of the cloud-based automated assistant components 115 in responding to various requests received by user interface component(s) 112 of the client device 110. Further, and as also described below, other engine(s) of the client device 110 can optionally interact with one or more of the cloud-based automated assistant components 115.

The one or more cloud-based automated assistant components 115 can be implemented on one or more computing systems (e.g., server(s) collectively referred to as a "cloud" or a "remote" computing system) that are communicatively coupled to the client device 110 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 115 with the client device 110 is indicated generally by 1991 of FIG. 1. Also, in some implementations, the client device 110 may be communicatively coupled with other client devices (not depicted) that are described herein via one or more networks (e.g., LANs and/or WANs).

The one or more of cloud-based automated assistant components 115 can also be communicatively coupled with one or more of the first-party servers 191 and/or one or more of the third-party servers 192 via one or more networks (e.g., LANs, WANs, and/or other networks). The communicative coupling of the cloud-based automated assistant components 115 with the one or more of the first-party servers 191 is indicated generally by 1992 of FIG. 1. Further, the communicative coupling of the cloud-based automated assistant components 115 with the one or more of the third-party servers 192 is indicated generally by 1993 of FIG. 1. In some implementations, and although not explicitly depicted in FIG. 1, the client device 110 can additionally or alternatively be communicatively coupled with one or more of the first-party servers 191 and/or one or more of the third-party servers 192 via one or more networks (e.g., LANs, WANs, and/or other networks). Moreover, the one or more networks 1991, 1992, and 1993 are collectively referred to hereinafter as "network(s) 199" for the sake of simplicity.

The automated assistant client 113, by way of its interactions with one or more of the cloud-based automated assistant components 115, may form what appears to be, from a user's perspective, a logical instance of an automated assistant 120 with which the user of the client device 110 may engage in a human-to-computer dialog. For example, an instance of the automated assistant 120 encompassed by a dashed line includes the automated assistant client 113 of the client device 110 and one or more cloud-based automated assistant components 115. It thus should be understood that each user that engages with the automated assistant client 113 executing on the client device 110 may, in effect, engage with his or her own logical instance of the automated assistant 120 (or a logical instance of the automated assistant 120 that is shared amongst a household or other group of users and/or shared amongst multiple automated assistant clients 113). Although only the client device 110 is illustrated in FIG. 1, it is understood that one or more of cloud-based automated assistant components 115 can additionally serve many additional groups of client devices. Moreover, although the cloud-based automated assistant components 115 are illustrated in FIG. 1, it is understood that, in various implementations, the automated assistant 120 can be implemented exclusively at the client device 110.

As used herein, a first-party device or system (e.g., the one or more first-party servers 191, one or more first-party software applications, etc.) references a system that is controlled by a party that is the same as the party that controls the automated assistant 120 referenced herein. For example, the one or more first-party servers 191 can reference a system that hosts a search engine service, a communications service (e.g., email, SMS messaging, etc.), a navigation service, a music service, a document editing or sharing service, and/or other services that are controlled a party that is the same as the party that controls the automated assistant 120 referenced herein. In contrast, a third-party device or system (e.g., the one or more third-party servers 192, one or more third-party software applications, etc.) references a system that is controlled by a party that is distinct from the party that controls the automated assistant 120 referenced herein. For example, the one or more third-party servers 192 can reference a system that hosts the same services, but those services are controlled by a party that is different from the party that controls the automated assistant 120 referenced herein.

The client device 110 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart networked device, such as a smart appliance, a smart television, a smart light, or smart washer/dryer, etc., a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative client devices may be provided.

In various implementations, the client device 110 may include one or more presence sensors 111 that are configured to provide, with approval from a user of the client device 110, signals indicative of detected presence, particularly human presence. In some of those implementations, the automated assistant 120 can identify the client device 110 (or another computing device associated with the user of the client device 110) to satisfy a spoken utterance (or other input directed to the automated assistant 120) based at least in part of presence of the user at the client device 110 (or at another computing device associated with the user of the client device 110). The spoken utterance (or other input directed to the automated assistant 120) can be satisfied by rendering responsive content (e.g., audibly and/or visually) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance (or other input directed to the automated assistant 120). As described herein, the automated assistant 120 can leverage data determined based on the presence sensors 111 in determining the client device 110 (or other computing device(s)) based on where a user is near or was recently near, and provide corresponding commands to only the client device 110 (or those other computing device(s)). In some additional or alternative implementations, the automated assistant 120 can leverage data determined based on the presence sensors 111 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 111 may come in various forms. For example, the client device 110 may be equipped with one or more vision components (e.g., digital camera(s) and/or other vision component(s)) that are configured to capture and provide signal(s) indicative of movement detected in their fields of view. Additionally, or alternatively, the client device 110 may be equipped with other types of light-based presence sensors 111, such as passive infrared ("PIR") sensors that measure infrared ("IR") light radiating from objects within their fields of view. Additionally, or alternatively the client device 110 may be equipped with presence sensors 111 that detect acoustic (or pressure) waves, such as one or more microphones.

Additionally, or alternatively, in some implementations, the presence sensors 111 may be configured to detect other phenomena associated with human presence or device presence. For example, in some embodiments, the client device 110 may be equipped with a presence sensor 111 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 111 of the client device 110 (and optionally GPS sensors and/or accelerometers). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 120, especially if not much time has passed since the last engagement.

The client device 110 further includes user interface component(s) 112, which can include one or more user interface input devices (e.g., microphone(s), touchscreen, keyboard, and/or other input devices) and/or one or more user interface output devices (e.g., display, speaker, projector, and/or other output devices). Further, the client device 110 and/or any other computing device(s) may include one or more memories for storage of data and software applications, one or more processors for accessing data and executing applications, and other components that facilitate communication over the network(s) 199. In some implementations, the operations performed by the client device 110, other computing device(s), and/or by the automated assistant 120 may be distributed across multiple computer systems, whereas in other implementations, the operations described herein may be performed exclusively at the client device 110 or at a remote system. The automated assistant 120 may be implemented as, for example, computer programs running on one or more computers in one or more locations that are coupled to each other through a network (e.g., the network(s) 199 of FIG. 1).

As noted above, in various implementations, the client device 110 may operate the automated assistant client 113. In various embodiments, the automated assistant client 113 may include a speech capture/automatic speech recognition (ASR)/natural language understanding (NLU)/text-to-speech (TTS)/fulfillment module 114. In other implementations, one or more aspects of the respective speech capture/ASR/NLU/TTS/fulfillment module 114 may be implemented separately from the automated assistant client 113 (e.g., by one or more of the cloud-based automated assistant components 115).

The speech capture/ASR/NLU/TTS/fulfillment module 114 may be configured to perform one or more functions including, for example: capture a user's speech (speech capture, e.g., via respective microphone(s) (which in some cases may comprise one or more of the presence sensors 111)); convert that captured audio to recognized text and/or to other representations or embeddings using ASR model(s) stored in the machine learning (ML) model(s) database 120A; parse and/or annotate the recognized text using NLU model(s) stored in the ML model(s) database 120A; and/or determine fulfillment data to be utilized in generating structured requests to obtain data and/or to cause action(s) to be performed responsive the user's speech using one or more fulfillment rule(s) and/or fulfillment model(s) stored in the ML model(s) database 120A. Further, the speech capture/ASR/NLU/TTS/fulfillment module 114 may be configured to convert text-to-speech using TTS model(s) stored in the ML model(s) database 120A, and synthesized speech audio data capturing synthesized speech based on to the text-to-speech conversion can be provided for audible presentation to the user of the client device 110 via speaker(s) of the client device 110. Instance(s) of these ML model(s) may be stored locally at the client device 110 and/or accessible by the client device 110 over the network(s) 199 of FIG. 1. In some implementations, because the client device 110 may be relatively constrained in terms of computing resources (e.g., processor cycles, memory, battery, etc.), the respective speech capture/ASR/NLU/TTS/fulfillment module 114 that is local to the client device 110 may be configured to convert a finite number of different spoken phrases to text (or to other forms, such as lower dimensionality embeddings) using the speech recognition model(s).

Some speech input may be sent to one or more of the cloud-based automated assistant components 115, which may include a cloud-based ASR module 116, a cloud-based NLU module 117, a cloud-based TTS module 118, and/or a cloud-based fulfillment module 119. These cloud-based automated assistant components 115 can leverage the virtually limitless resources of the cloud to perform the same or similar functionality described with respect to the speech capture/ASR/NLU/TTS/fulfillment module 114 that is local to the client device 110, but it should be noted that the speech capture/ASR/NLU/TTS/fulfillment module 114 can perform this functionality locally at the client device 110 without interacting with the cloud-based automated assistant components 115.

Although FIG. 1 is described with respect to a single client device having a single user, it should be understood that is for the sake of example and is not meant to be limiting. For example, one or more additional client devices of a user can also implement the techniques described herein. These additional client devices may be in communication with the client device 110 (e.g., over the network(s) 199). As another example, the client device 110 can be utilized by multiple users in a shared setting (e.g., a group of users, a household, a hotel room, a shared space at a business, etc.).

In some implementations, the client device 110 can further include various engines that are utilized in causing certain reasoning with respect to fulfillment of an assistant command that is included in user input and that is directed to the automated assistant 120 to be provided for presentation to the user of the client device 110 in response to additional user input that requests the certain reasoning. For example, and as depicted in FIG. 1, the client device 110 can further include a request engine 130 and a reasoning engine 140. The client device 110 can further include on-device memory, including user profile(s) database 110A, the ML model(s) database 120A, and metadata database 140A. In some implementations, these various engines can be executed exclusively on the client device 110. In additional or alternative implementations, one or more of these various engines can be executed remotely from the client device 110 (e.g., as part of the cloud-based automated assistant components 115). For example, in implementations where the assistant command is fulfilled locally at the client device 110, on-device instances of these various engines can be utilized to perform the operations described herein. However, in implementations where the assistant command is fulfilled remotely from the client device 110 (e.g., as part of the cloud-based automated assistant components 115), remote instances of these various engines can be utilized to perform the operations described herein In some implementations, and subsequent to fulfilling an assistant command that is included in user input detected via the user interface component(s) 112 of the client device and that is directed to the automated assistant 120, the request engine 130 can cause additional user input to be processed (e.g., using one or more aspects of the speech capture/ASR/NLU/TTS/fulfillment module 114) to determine whether the additional user input includes a request. For example, assume a user of the client device 110 provides a spoken utterance of "turn on the lights" to cause lights at a dwelling of a user of the client device 110 to be turned from an off state to an on state. As described in more detail with respect to FIGS. 2 and 3, audio data capturing the spoken utterance can be processed, using the ASR model(s) stored in the ML model(s) database 120A, to generate ASR output (optionally including ASR metrics), the ASR output can be processed, using the NLU model(s) stored in the ML model(s) database 120A, to generate NLU output (optionally including NLU metrics), and NLU output can be processed, using fulfillment rule(s) and/or fulfillment model(s) stored in the ML model(s) database 120A, to generate fulfillment output. Structured request(s) associated with the fulfillment output can be transmitted to one or more fulfillers, such as various software applications executing locally at the client device 110 and/or remotely at the first-party server(s) 191 and/or the third-party server(s) 192, and one or more fulfillment candidates can be generated responsive to the structured request(s) (and each of the fulfillment metrics can be associated with one or more corresponding fulfillment measures). The automated assistant 120 can cause the one or more fulfillment candidates to be ranked based on ASR metrics, NLU metrics, and/or fulfillment metrics. The ASR metrics, NLU metrics, fulfillment metrics, and/or any other data associated with fulfillment of the spoken utterance can be stored in the metadata database 140A. This data can be subsequently accessed by the automated assistant 120 to determine data associated with providing certain reasoning for fulfillment of assistant commands as described herein (e.g., with respect to FIGS. 2, 3, 4A-4C, and 5A-5B).

However, in this example, further assume that the user of the client device 110 has not granted the automated assistant 120 access to a software application or service associated with controlling lights at the dwelling of the user of the client device. Accordingly, the one or more fulfillment candidates in this example may indicate that there is no software application accessible at the client device 110 or at a server (e.g., the first-party server(s) 191 and/or the third-party servers) capable of satisfying the spoken utterance since data to be utilized in turning on the lights cannot be determined at least due to the lack of access to one or more of these fulfillers. As a result, the automated assistant 120 can determine alternate data to be utilized in notifying the user of the client device 110 that the automated assistant 120 cannot satisfy the spoken utterance. Accordingly, the automated assistant 120 can utilize the speech capture/ASR/NLU/TTS/fulfillment module 114 to generate synthesized speech audio data that includes synthesized speech of, for example, "Sorry, but I cannot turn on the lights" based on the alternate data, and cause the synthesized speech to be provided for audible presentation via speaker(s) of the client device 110.

In some implementations, and assuming the user of the client device 110 provides the additional user input requesting the automated assistant 120 provide certain reasoning with respect to why the automated assistant 120 caused certain fulfillment of the assistant command to be performed, the request engine 130 can determine whether the request is a general request for certain reasoning with respect to the fulfillment or a particular request for certain reasoning with respect to the fulfillment. The request engine 130 can determine whether the request is a general request for certain reasoning with respect to the fulfillment or a particular request for certain reasoning with respect to the fulfillment based on at least NLU output generated based on processing the additional user input, and the reasoning engine 140 can adapt additional data determined to be utilized in providing the certain reasoning based on the type of request (e.g., as described with respect to FIGS. 2, 3, 4A-4C, and 5A-5B). In additional or alternative implementations, the automated assistant 120 can obtain recommendation data to determine a recommended action that, when performed, enables the automated assistant 120 to cause certain fulfillment of the assistant command. In this example, the recommended action can include granting the automated assistant 120 access to a software application or service capable of causing the lights to be controlled. Accordingly, the automated assistant 120 can utilize the speech capture/ASR/NLU/TTS/fulfillment module 114 to generate additional synthesized speech audio data that includes synthesized speech of, for example, "I would be able to control the lights if you granted me access to lights application" based on the recommendation data, and cause the synthesized speech to be provided for audible presentation via speaker(s) of the client device 110. It should be understood that the above description is provided for the sake of example and is not meant to be limiting, and it is noted that additional description of the techniques described herein is provided below with respect to FIGS. 2, 3, 4A-4C, and 5A-5B.

Figure 2:
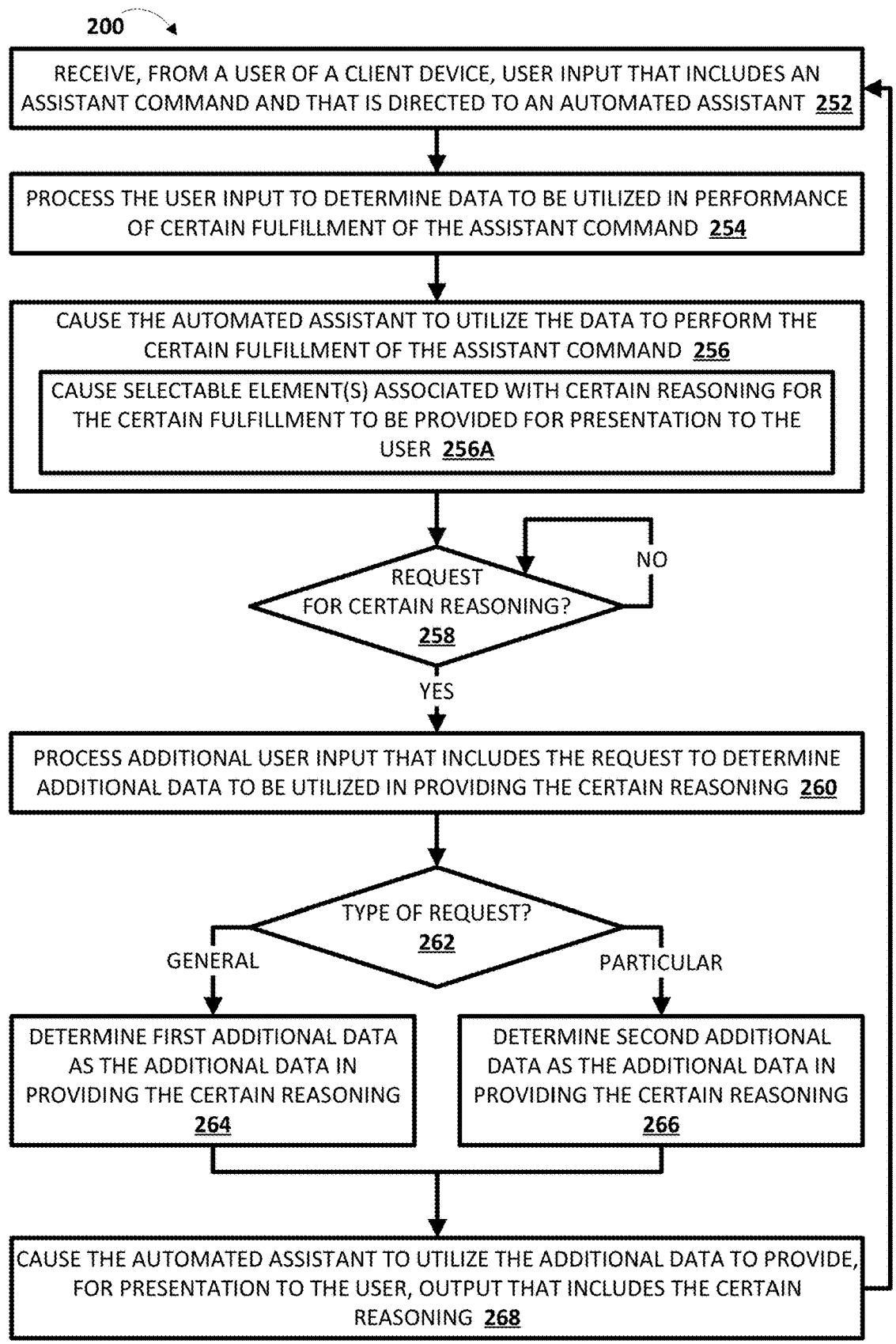
FIG. 2 depicts a flowchart illustrating an example method of causing certain fulfillment of an assistant command that is included in user input and that is directed to an automated assistant to be performed, and causing certain reasoning with respect to why the automated assistant caused the certain fulfillment of the assistant command to be provided, in accordance with various implementations.

Turning now to FIG. 2, a flowchart illustrating an example method 200 of causing certain fulfillment of an assistant command that is included in user input and that is directed to an automated assistant to be performed is depicted. For convenience, the operations of the method 200 are described with reference to a system that performs the operations. This system of the method 200 includes one or more processors, memory, and/or other component(s) of computing device(s) (e.g., client device 110 of FIG. 1, client device 410 of FIGS. 4A-4C, client device 510 of FIGS. 5A-5B, computing device 610 of FIG. 6, one or more servers, and/or other computing devices). Moreover, while operations of the method 200 are shown in a particular order, this is not meant to be limiting. One or more operations may be reordered, omitted, and/or added.

At block 252, the system receives, from a user of a client device, user input that includes an assistant command and that is directed to an automated assistant. In some implementations, the user input can correspond to a spoken utterance captured in audio data generated by microphone(s) of the client device. In additional or alternative implementations, the user input can correspond to touch input or typed input received via a display of the client device or another input device of the client device (e.g., a keyboard and/or mouse).

At block 254, the system processes the user input to determine data to be utilized in performance of certain fulfillment of the assistant command. In implementations where the user input corresponds to the spoken utterance, the audio data capturing the spoken utterance can be processed, using ASR model(s), to generate ASR output (e.g., speech hypothes(es), phoneme(s), and/or other ASR output) and optionally ASR metrics associated with the ASR output. Further, the ASR output can be processed, using NLU model(s), to generate NLU output (e.g., intent(s) determined based on the ASR output, slot value(s) for parameter(s) associated with the intent(s) determined based on the ASR output, etc.), and optionally NLU metrics associated with the NLU output. Moreover, the NLU output can be processed, using fulfillment rule(s) and/or fulfillment model(s), to generate fulfillment output to be utilized in generating requests to be transmitted to obtain the data utilized in performance of fulfillment of the assistant command and/or to cause action(s) to be performed based on the fulfillment output (e.g., transmitted the first-party server(s) 191 of FIG. 1, the third-party server(s) 192 of FIG. 1, first-party software application(s) implemented locally at the client device, third-party software application(s) implemented locally at the client device, etc.), and optionally fulfillment metrics associated with the fulfillment data. In implementations where the user input corresponds to the touch input or typed input, text corresponding to the touch input or typed input can be processed, using the NLU model(s), to generate the NLU output, and optionally the NLU metrics associated with the NLU output. Further, the NLU output can be processed, using the fulfillment rule(s) and/or the fulfillment model(s), to generate the fulfillment output utilized in generating the requests to be transmitted to obtain the data utilized in performance of fulfillment of the assistant command and/or to cause action(s) to be performed based on the fulfillment output in performance of fulfillment of the assistant command.

At block 256, the system causes the automated assistant to utilize the data to perform the certain fulfillment of the assistant command. Notably, the fulfillment output can include data transmitted to transmitted to one or more of the first-party server(s) 191 of FIG. 1, the third-party server(s) 192 of FIG. 1, first-party software application(s) implemented locally at the client device, third-party software application(s) implemented locally at the client device, etc., resulting in one or more fulfillment candidates. The system can select a certain fulfillment candidate, from among the one or more fulfillment candidates, to perform the certain fulfillment of the assistant command based on, for example, the ASR metrics, the NLU metrics, and/or the fulfillment metrics. For example, assume the user of the client device provides a spoken utterance of "play rock music". In this example, audio data capturing the spoken utterance can be processed, using the ASR model(s), to generate, as the ASR output, a first speech hypothesis of "play rock music" that is associated with a first ASR metric (e.g., a likelihood that the first speech hypothesis corresponds to term(s) and/or phrase(s) included in the spoken utterance, such as a probability, binary value, log likelihood, etc.), a second speech hypothesis of "play Bach music" that is associated with a second ASR metric, and/or other speech hypotheses and corresponding metrics. Further, each of the speech hypotheses can be processed, using the NLU model(s) to generate, as the NLU data, a first intent of "play music" with a slot value of "rock" for a genre parameter that is associated with a first NLU metric (e.g., a likelihood that the first intent and slot value(s) correspond to a desired intent of the user, such as a probability, binary value, log likelihood, etc.), and a second intent of "play music" with a slot value of "Bach" for an artist parameter that is associated with a second NLU metric.

Moreover, the one or more fulfillment candidates in this example can include, for example, a first fulfillment candidate of playing rock music using a first-party media application that is associated with a first fulfillment metric (e.g., returned to the system by the first-party media application responsive to a fulfillment request from the system), a second fulfillment candidate of playing rock music using a third-party media application that is associated with a second fulfillment metric (e.g., returned to the system by the third-party media application responsive to a fulfillment request from the system), a third fulfillment candidate of playing Bach music using the first-party media application that is associated with a third fulfillment metric (e.g., also returned to the system by the first-party media application responsive to a fulfillment request from the system), a fourth fulfillment candidate of playing Bach music using the third-party media application that is associated with a fourth fulfillment metric (e.g., also returned to the system by the third-party media application responsive to a fulfillment request from the system), and/or other fulfillment candidates. In this example, and assuming the ASR metrics, NLU metrics, and/or the fulfillment metrics indicate that the first fulfillment candidate of playing rock music using the first-party media application is most likely to satisfy the spoken utterance, the automated assistant can cause the first-party media application to begin playing rock music as the certain fulfillment of the assistant command. In this example, the system can infer slot values for other parameters associated with the "play music" intent and for the two interpretations (e.g., as part of the NLU output). For example, with respect to the first interpretation of "play rock music", the system can infer an artist slot value for an artist parameter (e.g., the user's most listened to rock artist), infer a software application slot value for a software application parameter (e.g., the user's most used application to listen to music), infer a song slot value for a song parameter (e.g., the user's most listened to rock song or most listened to Bach composition), etc., based on user profile data (e.g., stored in the user profile(s) database 110A of the client device 110 of FIG. 1) if any of this is accessible by the system. Otherwise, the system may utilize default slot values for one or more of these parameters. In other examples, the user may specify slot values for one or more of these parameters, such as particular artists, particular artists, particular software applications, etc.

In some implementations, block 256 may include sub-block 256A. If included, at sub-block 256A, the system causes one or more selectable elements associated with certain reasoning for the certain fulfillment to be provided for presentation to the user. The certain reasoning for the certain fulfillment can include, for example, one or more reasons why the certain fulfillment candidate was selected, from among the one or more fulfillment candidates, as being responsive to the user input. In response to receiving a user selection, from the user of the client device, of a given selectable element, of the one or more selectable elements, the system can cause the certain reasoning to be provided for presentation to the user of the client device. In some versions of those implementations, the system can cause one or more of the selectable elements associated with the certain reasoning for the certain fulfillment to be provided for presentation to the user in response to determining that the ASR metric, NLU metric, and/or the fulfillment metric that is associated with the selected certain fulfillment candidate fails to satisfy a metric threshold. Put another way, in response to the system determining that the selected certain fulfillment candidate is most likely what the user intended, but the system is not highly confident in the selected certain fulfillment candidate, the system can cause one or more of the selectable elements associated with certain reasoning for the certain fulfillment to be provided for presentation to the user. In other versions of those implementations, the system can cause one or more of the selectable elements associated with the certain reasoning for the certain fulfillment to be provided for presentation to the user regardless of the ASR metric, NLU metric, and/or the fulfillment metric that is associated with the selected certain fulfillment candidate. As described herein (e.g., with respect to FIG. 5B), the one or more selectable elements can be associated with a general request or one or more corresponding particular requests.

At block 258, the system determines whether a request for certain reasoning with respect to why the automated assistant caused the certain fulfillment to be performed is received at the client device. In some implementations, the request for certain reasoning with respect to why the automated assistant caused the certain fulfillment to be performed can be included in additional user input that is received at the client device. In some versions of those implementations, the system can process the additional user input using the ASR model(s) to generate ASR output, NLU model(s) to generate NLU data, and/or the fulfillment rule(s) or model(s) to generate fulfillment output in the same or similar manner described with respect to block 252 to determine whether the additional user input includes the request for the certain reasoning. For example, whether the additional user input is a spoken utterance or typed input, the additional user can be processed to generate NLU output, and the system can determine whether the additional user input includes the request for certain reasoning with respect to why the automated assistant caused the certain fulfillment to be performed based on the NLU output (e.g., an intent associated with a request for the certain reasoning). In additional or alternative versions of those implementations, the request for certain reasoning with respect to why the automated assistant caused the certain fulfillment to be performed can be included in a user selection of one or more selectable elements that is received at the client device (e.g., as described above with respect to sub-block 256A). If, at an iteration of block 258, the system determines that no request for certain reasoning with respect to why the automated assistant caused the certain fulfillment to be performed is received at the client device, the system continues monitoring for a request for certain reasoning with respect to why the automated assistant caused the certain fulfillment to be performed at block 258 (and optionally for a threshold duration of time after causing the certain fulfillment to be performed (e.g., 5 seconds, 10 seconds, 15 seconds, and/or any other threshold duration of time)). If, at an iteration of block 258, the system determines that a request for certain reasoning with respect to why the automated assistant caused the certain fulfillment to be performed is received at the client device, the system proceeds to block 260.

At block 260, the system processes additional user input that includes the request to determine additional data to be utilized in providing the certain reasoning. The additional data determined to be utilized in providing the certain reasoning can be based on, for example, a type of request included in the additional user input. Accordingly, at block 262, the system determines a type of request for the certain reasoning. The type of request can be for example, a general request for the certain reasoning with respect to why the automated assistant caused the certain fulfillment to be performed (e.g., "why did you do that?") or a particular request for the certain reasoning with respect to why the automated assistant caused the certain fulfillment to be performed (e.g., "why did you select the first-party music application?", "why didn't you select the third-party music application?", "why did you select the certain artist?", "why did you select the certain artist's most popular song?", and/or other particular requests). For example, the additional user can be processed to generate NLU output, and the system can determine whether the additional user input includes the request for certain reasoning with respect to why the automated assistant caused the certain fulfillment to be performed based on the NLU output (e.g., an intent associated with a general request for the certain reasoning and/or an intent associated with a particular request for the certain reasoning).

If, at an iteration of block 262, the system determines the type of request for the certain reasoning is a general request for the certain reasoning, the system proceeds to block 264. At block 264, the system determines first additional data as the additional data in providing the certain reasoning. Continuing with the above example of "play rock music", a general request for the certain reasoning can be embodied by, for example, a request of "why did you do that?", where "that" references the certain fulfillment candidate that was selected, such as playing rock music using a first-party media application along with a particular rock artist and a particular rock song that was selected. In response to determining the type of request is a general request, the system can obtain first data associated with the certain fulfillment candidate as the additional data corresponding to output of, for example, "I selected the first-party application because you share your application usage with me and use it the most to listen to music", "I selected a certain artist because you share your music preferences with me and you listen to the certain artist the most", "I selected a certain song by the certain artist because it the certain artist's most popular song", and/or other reasoning associated with why the system selected the certain fulfillment candidate (or inferred particular slot values) responsive to the user input.

If, at an iteration of block 262, the system determines the type of request for the certain reasoning is a particular request for the certain reasoning, the system proceeds to block 266. At block 266, the system determines second additional data as the additional data in providing the certain reasoning. Continuing with the above example of "play rock music", a particular request for the certain reasoning can be embodied by, for example, a request of "why did you select the first-party music application?", "why didn't you select the third-party music application?", "why did you select the certain artist?", "why did you select the certain artist's most popular song?", and/or other particular requests. In response to determining the type of request is a particular request, the system can obtain second data associated with the certain fulfillment candidate, or an alternate fulfillment candidate that was included in the one or more fulfillment candidates, as the additional data corresponding to output of, for example, "I selected the first-party application because you share your application usage with me and use it the most to listen to music", "I did not select the third-party application because you have not provided me with access to the third-party application", "I selected a certain artist because you share your music preferences with me and you listen to the certain artist the most", "I selected a certain song by the certain artist because it the certain artist's most popular song", and/or other reasoning associated with why the system selected the certain fulfillment candidate, or did not select a particular alternate fulfillment candidate, responsive to the user input.

At block 268, the system causes the automated assistant to utilize the additional data to provide, for presentation to the user, output that includes the certain reasoning. In some implementations, the output that includes the certain reasoning can include synthesized speech audio data that includes synthesized speech capturing the certain reasoning characterized by the additional data. In some versions of these implementations, text corresponding to the certain reasoning that is generated by the system based on metadata associated with the one or more fulfillment candidates can be processed, using TTS model(s) (e.g., stored in the ML model(s) database 120A of FIG. 1) to generate the synthesized speech audio data, and the synthesized speech audio data can be audibly rendered for presentation to the user via speaker(s) of the client device or an additional client device in communication with the client device. In additional or alternative implementations, the output that includes the certain reasoning can include text or other graphical content that is visually rendered for presentation to the user via a display of the client device or an additional client device in communication with the client device. The system may return to block 252 and perform an additional iteration of the method 200 of FIG. 2 in response to receiving further user input that includes a further assistant command and that is directed to the automated assistant.

Figure 3:
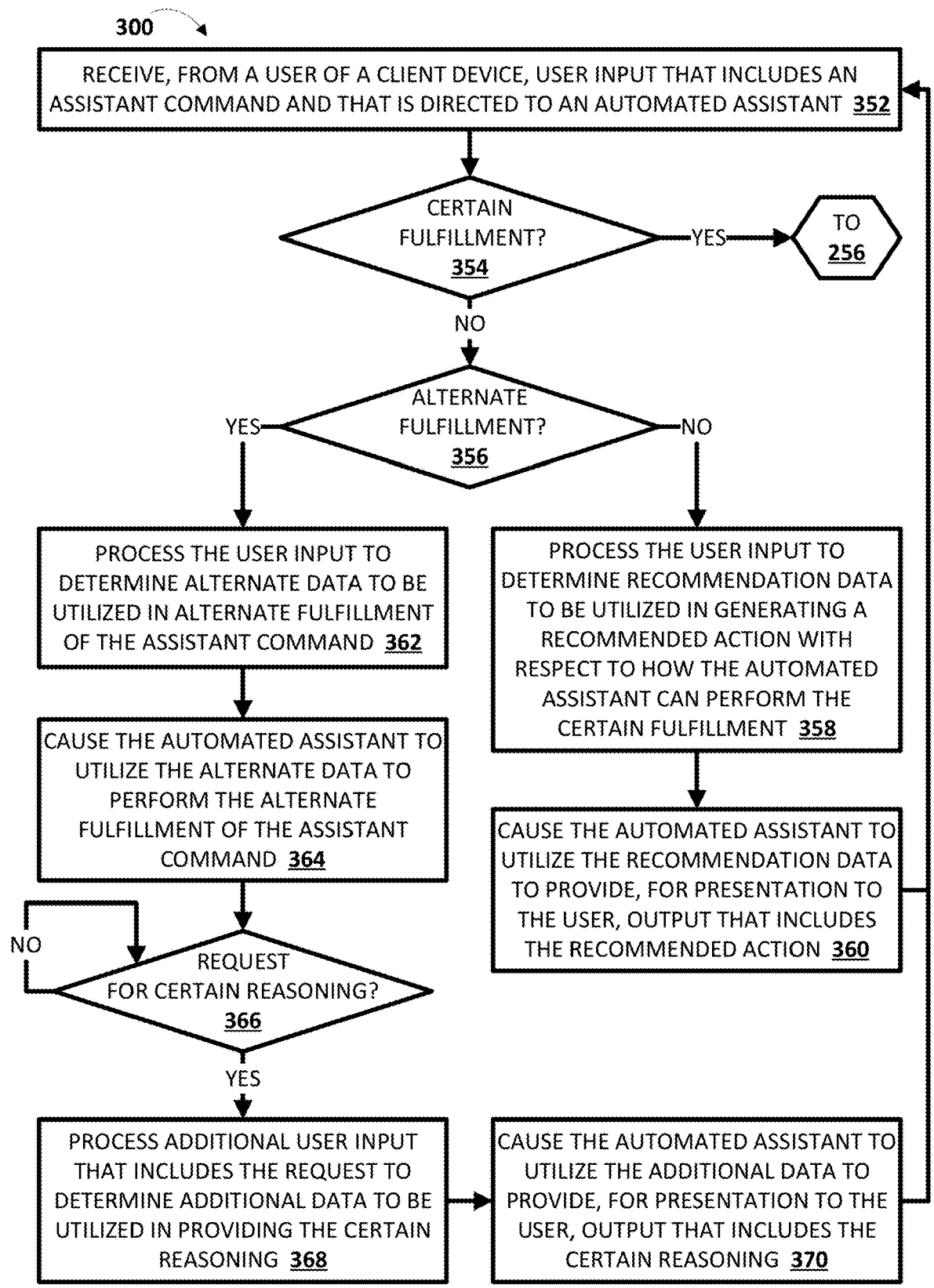
FIG. 3 depicts a flowchart illustrating an example method of determining certain fulfillment of an assistant command that is included in user input and that is directed to an automated assistant cannot be performed, and causing certain reasoning with respect to why the automated assistant cannot perform the certain reasoning to be provided, in accordance with various implementations.

Turning now to FIG. 3, a flowchart illustrating an example method 300 of determining certain fulfillment of an assistant command that is included in user input and that is directed to an automated assistant cannot be performed is depicted. For convenience, the operations of the method 300 are described with reference to a system that performs the operations. This system of the method 300 includes one or more processors, memory, and/or other component(s) of computing device(s) (e.g., client device 110 of FIG. 1, client device 410 of FIGS. 4A-4C, client device 510 of FIGS. 5A-5B, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system receives, from a user of a client device, user input that includes an assistant command and that is directed to an automated assistant. In some implementations, the user input can correspond to a spoken utterance captured in audio data generated by microphone(s) of the client device. In additional or alternative implementations, the user input can correspond to touch input or typed input received via a display of the client device or another input device of the client device (e.g., a keyboard and/or mouse).

At block 354, the system determines whether data to be utilized in performance of certain fulfillment of the assistant command can be determined. In implementations where the user input corresponds to the spoken utterance, the audio data capturing the spoken utterance can be processed, using ASR model(s), to generate ASR output (e.g., speech hypothes(es), phoneme(s), and/or other ASR output) and optionally ASR metrics associated with the ASR output. Further, the ASR output can be processed, using NLU model(s), to generate NLU output (e.g., intent(s) determined based on the ASR output, slot value(s) for parameter(s) associated with the intent(s) determined based on the ASR output, etc.), and optionally NLU metrics associated with the NLU output. Moreover, the NLU output can be processed, using fulfillment rule(s) and/or fulfillment model(s), to generate fulfillment data to be utilized in performance of fulfillment of the assistant command, and optionally fulfillment metrics associated with the fulfillment data. In implementations where the user input corresponds to the touch input or typed input, text corresponding to the touch input or typed input can be processed, using the NLU model(s), to generate the NLU output, and optionally the NLU metrics associated with the NLU output. Further, the NLU output can be processed, using the fulfillment rule(s) and/or the fulfillment model(s), to generate the fulfillment output utilized in generating the requests to be transmitted to obtain the data utilized in performance of fulfillment of the assistant command and/or to cause action(s) to be performed based on the fulfillment output in performance of fulfillment of the assistant command.

The system can determine whether data to be utilized in performance of certain fulfillment of the assistant command can be determined based on data received responsive to the fulfillment output being transmitted to obtain the data utilized in performance of fulfillment of the assistant command and/or to cause action(s) to be performed based on the fulfillment output in performance of fulfillment of the assistant command. As noted above with respect to FIG. 2, the data can be obtained responsive to the fulfillment output can include one or more fulfillment candidates. The system can select a certain fulfillment candidate, from among the one or more fulfillment candidates, to perform the certain fulfillment of the assistant command based on, for example, the ASR metrics, the NLU metrics, and/or the fulfillment metrics associated with the user input. For example, assume the user of the client device provides a spoken utterance of "turn on the lights". In this example, audio data capturing the spoken utterance can be processed, using the ASR model(s), to generate, as the ASR output, a speech hypothesis of "turn on the lights" that is associated with an ASR metric (e.g., a likelihood that the first speech hypothesis corresponds to term(s) and/or phrase(s) included in the spoken utterance, such as a probability, binary value, log likelihood, etc.). Further, each of the speech hypotheses can be processed, using the NLU model(s) to generate, as the NLU data, an intent of "turn on lights" that is associated with an NLU metric (e.g., a likelihood that the first intent and slot value(s) correspond to a desired intent of the user, such as a probability, binary value, log likelihood, etc.). Moreover, the fulfillment output can include, for example, a request to one or more software applications (e.g., first-party software applications and/or third-party software applications capable of turning on the lights). However, in this example, assume the automated assistant does not have access to any software application utilized to control the lights. Accordingly, in this example, the system may not be able to transmit the fulfillment output to any software applications and the one or more fulfillment candidates may only include a null fulfillment candidate that indicates the spoken utterance cannot be fulfilled since the automated assistant cannot interact with a software application to control the lights. In contrast, and assuming the automated assistant does have access a software application utilized to control the lights, the system may determine that data to be utilized in performance of the certain fulfillment of the assistant command can be determined since the automated assistant can interact with a software application to control the lights, and the one or more fulfillment candidates can include one or more assistant commands that, when executed, cause the lights to be controlled.

If, at an iteration of block 354, the system determines that data to be utilized in performance of certain fulfillment of the assistant command can be determined, the system proceeds to block 256 of FIG. 2, and continues an iteration of the method 200 of FIG. 2. For instance, in the above example where the automated assistant has access to the software application utilized to control the lights, the system can proceed to block 256 of FIG. 2 and continue an iteration of the method 200 of FIG. 2 described above from block 256 to cause the certain fulfillment of the assistant command to be performed, and provide the certain reasoning for the certain fulfillment if requested as described above with respect to FIG. 2. If, at an iteration of block 354, the system determines that data to be utilized in performance of certain fulfillment of the assistant command cannot be determined, the system proceeds to block 356. For instance, in the above example where the automated assistant has access to the software application utilized to control the lights, the system can proceed to block 356.

At block 356, the system determines whether alternate data to be utilized in performance of alternate fulfillment of the assistant command can be determined. For example, the system can analyze the one or more fulfillment candidates to determine whether there are one or more alternate fulfillment candidates. If, at an iteration of block 356, the system determines that alternate data to be utilized in performance of alternate fulfillment of the assistant command cannot be determined, the system proceeds to block 358. For instance, and continuing with the above example where the user of the client device provides the spoken utterance of "turn on the lights" and the automated assistant does not have access to any software application for controlling the lights, the system can determine that no alternate fulfillment candidates are included in the one or more fulfillment candidates (e.g., only the null fulfillment candidate). In this instance, the system can determine to proceed to block 358.

At block 358, the system processes the user input to determine recommendation data to be utilized in generating a recommended action with respect to how the automated assistant can perform the certain fulfillment. Continuing with the above example, the system can determine that the certain fulfillment of controlling the lights response to the spoken utterance of "turn on the lights" could be performed, but for the fact that the user has not granted the automated assistant access to the software application that is utilized to control the lights. Accordingly, in this example, the recommended action can include an indication that the user should grant the automated assistant access to the software application utilized in controlling the lights. As another example, and assuming that the no software application is installed at the client device for controlling the lights, the system can determine that the certain fulfillment of controlling the lights response to the spoken utterance of "turn on the lights" could be performed, but for the fact that the user has not installed the software application that is utilized to control the lights, and that the user needs to grant the automated assistant access to the software application that is utilized to control the lights.

At block 360, the system causes the automated assistant to utilize the recommendation data to provide, for presentation to the user, output that includes the recommended action. The output that includes the recommended action can be audibly and/or visually rendered for presentation to the user (e.g., as described with respect to block 268 of FIG. 2). In some implementations, the output that includes the recommended action can include a prompt that enables the user to provide additional input that causes the automated assistant to automatically perform the recommended action. Continuing with the above example, the system can cause output of "I cannot turn on the lights right now, but I can if you grant me access to the software application utilized to control the lights, would you like to grant me access?". Accordingly, the output provided for presentation to the user that includes the recommended action can indicate one or more of how the automated assistant can perform the certain fulfillment of the assistant command (e.g., "I cannot turn on the lights right now, but I can if you grant me access to the software application utilized to control the lights"), and prompt the user to cause performance of the certain fulfillment of the assistant command (e.g., "would you like to grant me access?"). In additional or alternative implementations, the output that includes the recommended action can include step-by-step instructions for the user to follow to enable the automated assistant to perform the certain fulfillment of the assistant command (e.g., "(1) open settings, (2) open software application sharing settings, (3) share software application settings for the lights application"). The system may return to block 352 and perform an additional iteration of the method 300 of FIG. 3 in response to receiving further user input that includes a further assistant command and that is directed to the automated assistant.

If, at an iteration of block 356, the system determines that alternate data to be utilized in performance of alternate fulfillment of the assistant command can be determined, the system proceeds to block 362. In contrast with the example where the user provides a spoken utterance of "turn on the lights", assume that the user provides a spoken utterance of "play rock music using application 2" that is received at block 352. Further assume that the user has not granted the automated assistant access to "application 2". Accordingly, in this example, the certain fulfillment of playing rock music at "application 2" cannot be performed at an instance of block 354. However, at an instance of block 356, the system may determine that there is an alternate fulfillment candidate unlike in the previous example. For instance, further assume in this example that the user has granted the automated assistant access to "application 1" such that the automated assistant can alternatively utilize "application 1" to play rock music.

At block 362, the system processes the user input to determine alternate data to be utilized in alternate fulfillment of the assistant command. Continuing with the above example where the user provides the spoken utterance of "play rock music using application 2", fulfillment output that includes a structured request to play rock music can be initially transmitted to at least "application 2". In some implementations, and in response to transmitting the fulfillment output to "application 2", the system may receive an indication of a null fulfillment candidate since the user has not granted the automated assistant access to "application 2". In additional or alternative implementations, the system may determine that the user has not granted the automated assistant access to "application 2", and the system may withhold transmitting the request to "application 2" and determine a null fulfillment candidate since the user has not granted the automated assistant access to "application 2". However, in an attempt to perform fulfillment of the request to play music, the system may transmit the fulfillment output to "application 1" (and optionally in response to determining that "application 2" is associated with the null fulfillment candidate), and determine an alternate data associated with an alternate fulfillment candidate of playing the rock music using "application 1" since the user has granted the automated assistant access to "application 1". Accordingly, even though the alternate fulfillment candidate is not the certain fulfillment of the assistant command included in the user input (e.g., since the alternate fulfillment candidate is associated with "application 1" rather than "application 2" as requested by the user), the system can attempt to fulfill the assistant command using the alternate fulfillment candidate.

At block 364, the system causes the automated assistant to utilize the alternate data to perform the alternate fulfillment of the assistant command. Continuing with the above example, the system can cause "application 1" to begin playing rock music via speaker(s) of the client device or via speaker(s) of an additional computing device in communication with the client device (e.g., smart speaker(s) in communication with the client device, another client device, etc.). In some implementations, and similar to sub-block 256A of FIG. 2, the system can cause one or more selectable elements associated with certain reasoning to be provided for presentation to the user. However, and in contrast with the above operation of sub-block 256A of FIG. 2, the certain reasoning may be provided with respect to why the alternate fulfillment was performed (e.g., why the rock music was played using "application 1") or why the certain fulfillment was not performed (e.g., why the rock music was not played using "application 2"). In these implementations, the certain reasoning for the alternate fulfillment can include, for example, one or more reasons why the alternate fulfillment candidate was selected, from among the one or more fulfillment candidates, as being responsive to the user input.

At block 366, the system determines whether a request for certain reasoning with respect to why the automated assistant caused the alternate fulfillment to be performed is received at the client device. In some implementations, the request for certain reasoning with respect to why the automated assistant caused the alternate fulfillment to be performed can be included in additional user input that is received at the client device. In some versions of those implementations, the system can process the additional user input using the ASR model(s) to generate ASR output, NLU model(s) to generate NLU data, and/or the fulfillment rule(s) or model(s) to generate fulfillment output in the same or similar manner described with respect to block 252 to determine whether the additional user input includes the request for the certain reasoning. For example, whether the additional user input is a spoken utterance or typed input, the additional user can be processed to generate NLU output, and the system can determine whether the additional user input includes the request for certain reasoning with respect to why the automated assistant caused the alternate fulfillment to be performed based on the NLU output (e.g., an intent associated with a request for the certain reasoning). In additional or alternative versions of those implementations, the request for certain reasoning with respect to why the automated assistant caused the alternate fulfillment to be performed can be included in a user selection of one or more selectable elements that is received at the client device (e.g., as described above with respect to sub-block 256A). If, at an iteration of block 366, the system determines that no request for certain reasoning with respect to why the automated assistant caused the alternate fulfillment to be performed is received at the client device, the system continues monitoring for a request for certain reasoning with respect to why the automated assistant caused the alternate fulfillment to be performed at block 366 (and optionally for a threshold duration of time after causing the certain fulfillment to be performed (e.g., 15 seconds, 20 seconds, 30 seconds, and/or any other threshold duration of time)). If, at an iteration of block 366, the system determines that a request for certain reasoning with respect to why the automated assistant caused the alternate fulfillment to be performed is received at the client device, the system proceeds to block 368. In some implementations, and similar to block 262 of FIG. 2, the system can determine a type of request for the certain reasoning (e.g., a general request, a first particular request, a second particular request, etc.).

At block 368, the system processes additional user input that includes the request to determine additional data to be utilized in providing the certain reasoning. Continuing with the above example "play rock music using application 2", a general request for the certain reasoning can be embodied by, for example, a request of "why did you do that?", where "that" references the alternate fulfillment candidate that was selected, such as playing rock music using "application 1" (instead of "application 2" as requested by the user) along with a particular rock artist and a particular rock song that was selected (e.g., inferred slot values as described above with respect to FIG. 2). In response to determining the type of request is a general request, the system can obtain the additional data associated with the additional data corresponding to output that is responsive to the general request (e.g., as described with respect to FIG. 2). Also continuing with the above example of "play rock music", a particular request for the certain reasoning can be embodied by, for example, a request of "why did you use application 1 instead of application 2 like I requested?", "why did you select the certain artist?", "why did you select the certain artist's most popular song?", and/or other particular requests. In response to determining the type of request is a particular request, the system can obtain the additional data corresponding to output that is responsive to the particular request (e.g., as described with respect to FIG. 2).

At block 370, the system causes the automated assistant to utilize the additional data to provide, for presentation to the user, output that includes the certain reasoning. In some implementations, the output that includes the certain reasoning can include synthesized speech audio data that includes synthesized speech capturing the certain reasoning characterized by the additional data. In some versions of these implementations, text corresponding to the certain reasoning that is generated by the system based on metadata associated with the one or more fulfillment candidates can be processed, using TTS model(s) (e.g., stored in the ML model(s) database 120A of FIG. 1) to generate the synthesized speech audio data, and the synthesized speech audio data can be audibly rendered for presentation to the user via speaker(s) of the client device or an additional client device in communication with the client device. In additional or alternative implementations, the output that includes the certain reasoning can include text or other graphical content that is visually rendered for presentation to the user via a display of the client device or an additional client device in communication with the client device. The system may return to block 352 and perform an additional iteration of the method 300 of FIG. 3 in response to receiving further user input that includes a further assistant command and that is directed to the automated assistant.

Figure 4A:
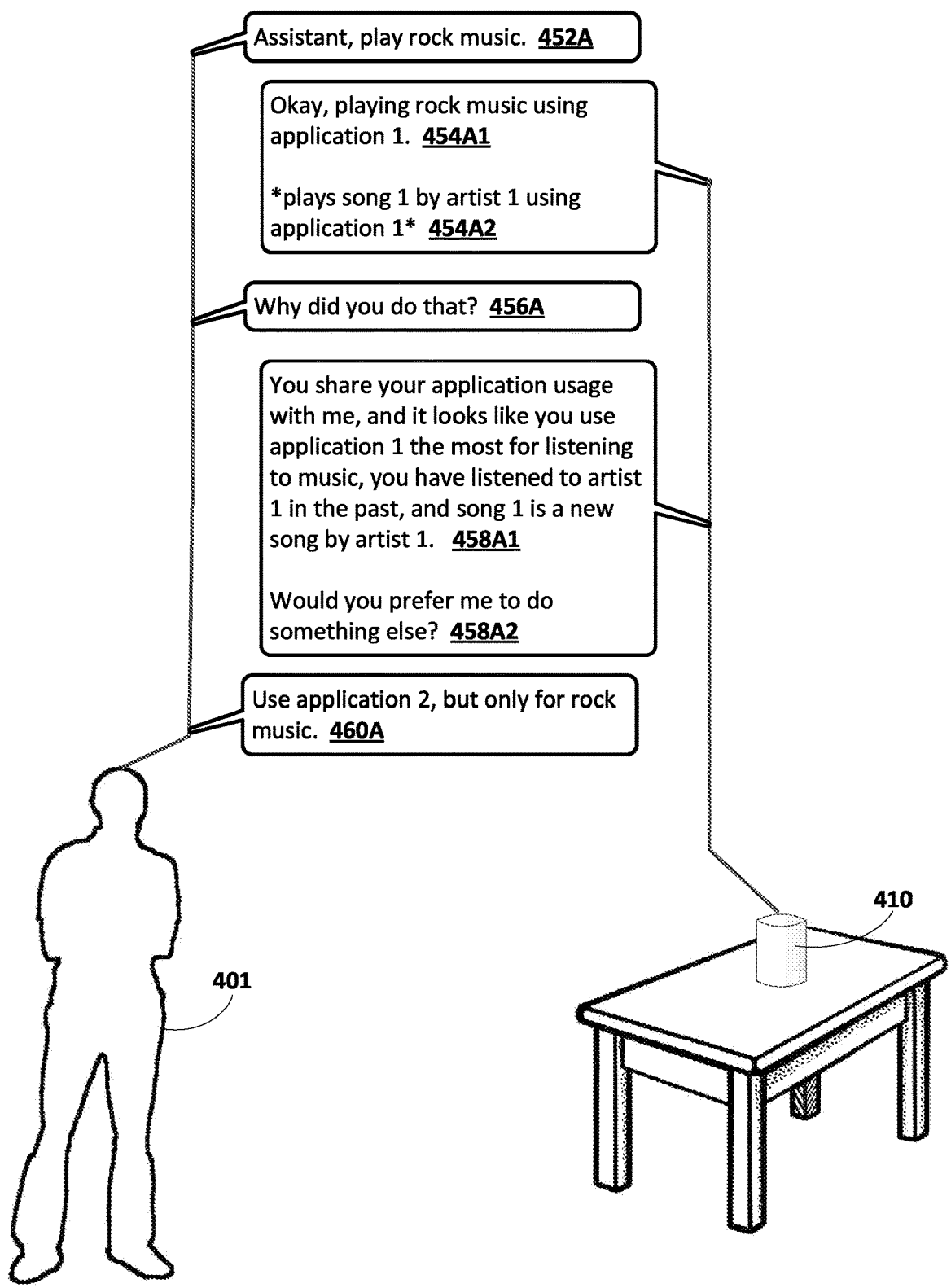
FIG. 4A, FIG. 4B, and FIG. 4C depict various non-limiting examples of causing certain reasoning with respect to fulfillment of an assistant command to be provided, in accordance with various implementations.
Figure 4B:
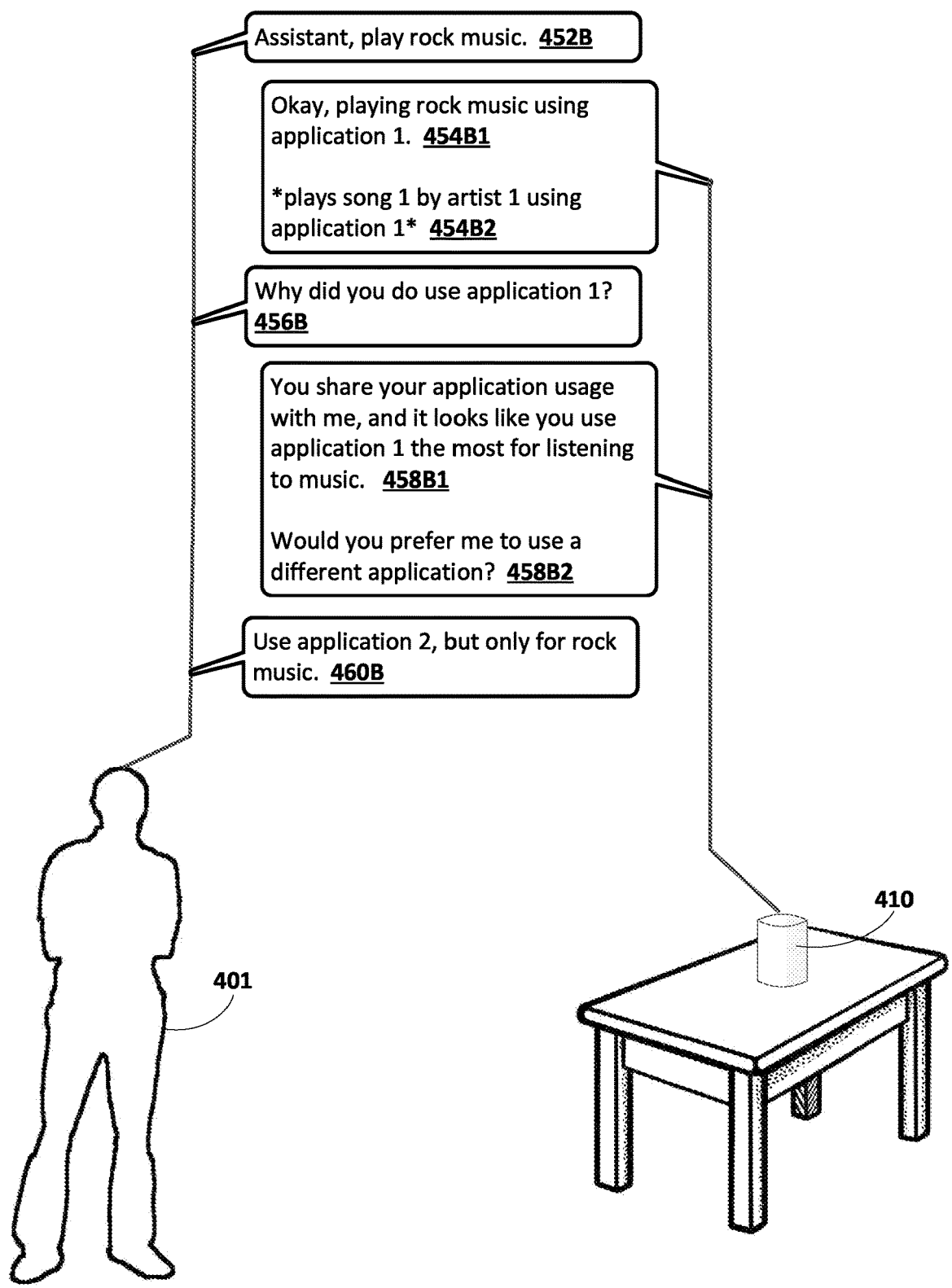
Figure 4C:
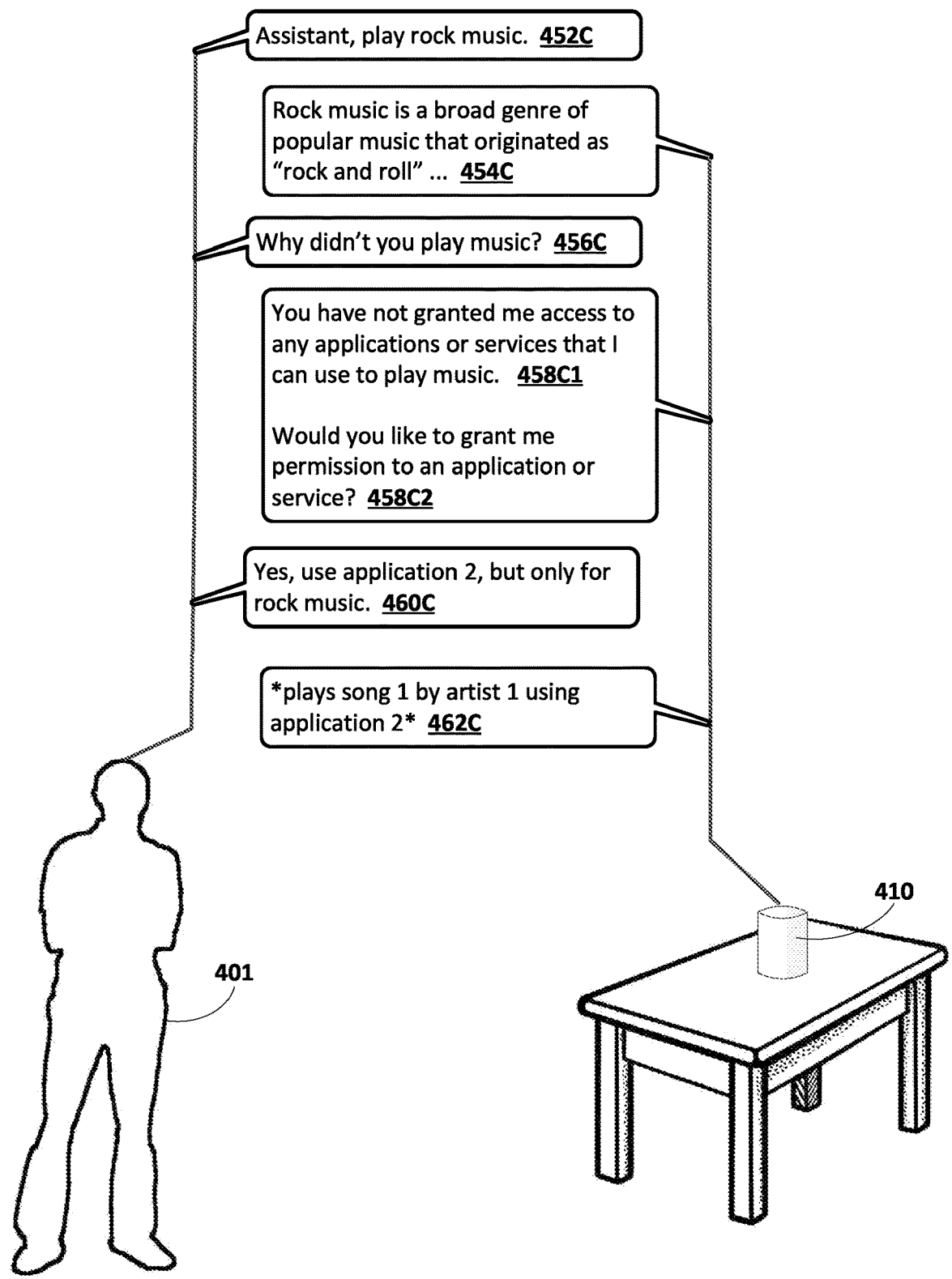

Turning now to FIGS. 4A-4C, various non-limiting examples of causing certain reasoning with respect to the fulfillment of an assistant command to be provided are depicted. A client device 410 (e.g., an instance of the client device 110 of FIG. 1) may include various user interface components including, for example, microphone(s) to generate audio data based on spoken utterances and/or other audible input, and/or speaker(s) to audibly render synthesized speech and/or other audible output. Although the client device 410 depicted in FIGS. 4A-4C is a standalone speaker without a display, it should be understood that is for the sake of example and is not meant to be limiting. For example, the client device 410 may be a standalone speaker with a display, a mobile phone (e.g., as described with respect to FIGS. 5A-5B), a home automation device, an in-vehicle system, a laptop, a desktop computer, and/or any other device capable of executing an automated assistant to engage in a human-to-computer dialog session with a user 401 of the client device 410.

Referring specifically to FIG. 4A, assume a user 401 of the client device 410 provides a spoken utterance 452A of "Assistant, play rock music." In response to receiving the spoken utterance 452A, the automated assistant can cause audio data that captures the spoken utterance 452A to be processed, using ASR model(s), to generate ASR output that includes, for example, one or more speech hypotheses (e.g., term hypotheses(es) and/or transcription hypotheses(es)) that are predicted to correspond to the spoken utterance 452A, one or more predicted phonemes that are predicted to correspond to the spoken 452A, and/or other ASR output. In generating the ASR output, the ASR model(s) can optionally generate ASR metrics associated with each of the one or more speech hypotheses, predicted phonemes, and/or other ASR output that are indicative of a likelihood that the one or more speech hypotheses, predicted phonemes, and/or other ASR output correspond to the spoken utterance 452A. Further, the ASR output can be processed, using NLU model(s), to generate NLU output that includes, for example, one or more intents determined based on the ASR output, one or more slot values for one or more corresponding parameters associated with each of the one or more intents determined based on the ASR output, and/or other NLU output. In generating the NLU output, the NLU model(s) can optionally generate NLU metrics associated with each of the one or more intents, the one or more slot values for the corresponding parameters associated with the intent, and/or other NLU output that are indicative of a likelihood that the one or more intents, the one or more slot values for the corresponding parameters associated with the intent, and/or other NLU output correspond to an actual intent of the user 401 in providing the spoken utterance 452A.

Notably, the automated assistant may infer one or more of the slot values for the corresponding parameters associated with each of the one or more intents, resulting in one or more interpretations of the spoken utterance 452A, where each of the one or more interpretations include at least one unique slot value for a given corresponding parameter. Accordingly, in the example of FIG. 4A, a first interpretation can include a "play music" intent having a slot value of "application 1" for an application parameter associated with the "play music" intent, a slot value of "artist 1" for an artist parameter associated with the "play music" intent, and a slot value of "song 1" for a song parameter associated with the "play music" intent; a second interpretation can include the "play music" intent having a slot value of "application 2" for the application parameter associated with the "play music" intent, the slot value of "artist 1" for the artist parameter associated with the "play music" intent, and the slot value of "song 1" for the song parameter associated with the "play music" intent; a third interpretation can include the "play music" intent having the slot value of "application 1" for the application parameter associated with the "play music" intent, a slot value of "artist 2" for the artist parameter associated with the "play music" intent, and the slot value of "song 2" for the song parameter associated with the "play music" intent; and so on for other interpretations.

Moreover, the automated assistant can cause the NLU output to be processed using fulfillment rule(s) and/or fulfillment model(s) to generate fulfillment output. The fulfillment output can include, for example, one or more structured requests that are generated based on the plurality of interpretations (e.g., determined based on the NLU output) and that are to be transmitted one or more fulfillers, such as the first-party server(s) 191 of FIG. 1, the third-party server(s) 192 of FIG. 1, first-party software application(s) accessible at the client device 410, third-party software application(s) accessible at the client device 410, and/or any other fulfiller capable of fulfilling the spoken utterance 452A. In the example of FIG. 4A, the automated assistant can cause corresponding structured requests to be transmitted to at least "application 1" and "application 2" based on these software applications being identified as being capable of satisfying the spoken utterance 452A as indicated by the NLU output. In response to transmitting these structured requests, the automated assistant can receive, from "application 1" and "application 2", one or more fulfillment candidates. For instance, the automated assistant can receive one or more fulfillment candidates from "application 1" that indicates whether "application 1" can fulfill one or more of the structured requests that are generated based on the plurality of interpretations, and can receive one or more fulfillment candidates from "application 2" that indicates whether "application 2" can fulfill one or more of the structured requests that are generated based on the plurality of interpretations. The one or more fulfillment candidates can optionally include fulfillment metrics that are indicative of how likely each of the one or more fulfillment candidates are of satisfying the spoken utterance 452A.

The automated assistant can rank the one or more fulfillment candidates based on the ASR metrics, the NLU metrics, and/or the fulfillments, and select a certain fulfillment candidate, from among the one or more fulfillment candidates, based on the ranking. For instance, assume in the example of FIG. 4A that the automated assistant selects, based on the ranking, a certain fulfillment candidate associated with the first interpretation that includes the "play music" intent having the slot value of "application 1" for the application parameter, the slot value of "artist 1" for the artist parameter, and the slot value of "song 1" for the song parameter as described above. Further assume that the user 401 has not granted the automated assistant access to "application 2", and, as a result, the one or more fulfillment candidates determined based on the one or more structured requests transmitted to "application 1" are null fulfillment candidates. In additional or alternative implementations, the automated assistant may withhold transmitting any structured requests to "application 2" to conserve computational and/or network resources since the automated assistant knows the user 401 has not granted the automated assistant access to "application 2", and automatically determine null fulfillment candidates for any potential structured requests that may be transmitted to "application 2". In response to selecting certain fulfillment candidate associated with the first interpretation, the automated assistant may cause synthesized speech 454A1 of "Okay, playing rock music using application 1" to be provided for audible presentation to the user 401 via speaker(s) of the client device 410, and cause an assistant command determined based on the first interpretation associated with the certain fulfillment candidate to be implemented as indicated by 454A2 (e.g., "plays song 1 by artist 1 using application 1") to satisfy the spoken utterance 452A.

However, further assume the user 401 provides an additional spoken utterance 456A of "Why did you do that?". In response to receiving the additional spoken utterance 456A, the automated assistant can cause audio data that captures the additional spoken utterance 456A to be processed, using the ASR model(s), to generate the ASR output in the same or similar manner described above with respect to processing the spoken utterance 452A. Further, the ASR output can be processed, using the NLU model(s), to generate NLU output in the same or similar manner described above with respect to processing the spoken utterance 452A. The automated assistant can determine, based on the ASR output and/or the NLU output, whether the additional spoken utterance 456A includes a request for the automated assistant to provide certain reasoning with respect to why certain fulfillment of the assistant command included in the spoken utterance 452A was performed. In some implementations, the automated assistant can additionally or alternatively determine, based on the ASR output and/or the NLU output, whether the request for the certain reasoning is a general request for the certain reasoning or one or more particular requests for the certain reasoning.

For instance, in the example of FIG. 4A, the automated assistant may determine, based on the ASR output and/or the NLU output generated based on processing the additional spoken utterance 456A, that the request for the certain reasoning is a general request since the user did not inquire about a particular aspect of the certain fulfillment (e.g., described below with respect to FIG. 4B). Rather, the additional spoken utterance 456A generally requests that the automated assistant explain why the automated assistant caused "application 1" to play "song 1" by "artist 1". Accordingly, the automated assistant can obtain metadata associated with the selected certain fulfillment candidate to determine additional data to be utilized in generating output responsive to the additional spoken utterance 456A. Based on the additional data, the automated assistant can cause additional synthesized speech 458A1 of "You share your application usage with me, and it looks like you use application 1 the most for listening to music, you have listened to artist 1 in the past, and song 1 is a new song by artist 1" to be provided for audible presentation to the user 401 via speaker(s) of the client device 410. In some implementations, the automated assistant can optionally cause a prompt 458A2 of (e.g., determined based on recommendation data), for example, "Would you prefer me to do something else?" to be provided for audible presentation to the user 401 via speaker(s) of the client device 410 that requests the user 401 to provide a further additional spoken utterance if the user 401 would prefer the automated assistant to perform some alternate fulfillment candidate, such as requesting the user 401 provide a further additional spoken utterance 460A of "Use application 2, but only for rock music".

Notably, the further additional spoken utterance 460A may implicitly grant the automated assistant access to "application 2" to be utilized responsive to the spoken utterance 452A and future instances of spoken utterances that include an assistant command for the automated assistant to play rock music. In some implementations, the further additional spoken utterance 460A may implicitly grant the automated assistant access to "application 2" to be utilized only for playing rock music. In additional or alternative implementations, the further additional spoken utterance 460A may implicitly grant the automated assistant access to "application 2" to be utilized for playing any genre of music. Further, in some implementations, the automated assistant can transition from playing "song 1" by "artist 1" using "application 1" (e.g., an assistant command based on the first interpretation described above) to playing "song 1" by "artist 1" using "application 2" (e.g., an assistant command based on the second interpretation described above) in response to receiving the further spoken utterance 460A that grants the automated assistant access to "application 2".

Referring specifically to FIG. 4B, and in contrast with the general request for the certain reasoning described with respect to FIG. 4A, again assume the user provides the same spoken utterance 452B of "Assistant, play rock music", the automated assistant causes synthesized speech 454B1 of "Okay, playing rock music using application 1" to be provided for audible presentation to the user 401 via the speaker(s) of the client device 410, and causes the assistant command determined based on the first interpretation associated with the certain fulfillment candidate to be implemented as indicated by 454B2 (e.g., "plays song 1 by artist 1 using application 1") to satisfy the spoken utterance 45BA. However, in the example of FIG. 4B, assume the user 401 provides an additional spoken utterance of "Why did you use application 1?". In this example, the automated assistant may determine, based on ASR output and/or NLU output generated based on processing the additional spoken utterance 456B, that the request for the certain reasoning is a particular request since the user is inquiring about a particular aspect of the certain fulfillment (e.g., why the automated assistant selected "application 1" to play "song 1" by "artist 1"). Accordingly, the automated assistant can obtain metadata associated with the selected certain fulfillment candidate to determine the additional data to be utilized in generating output responsive to the additional spoken utterance 456A. Notably, in the example of FIG. 4B, the additional data may differ from the additional data in the example of FIG. 4A in that the additional data utilized in the example of FIG. 4B can be tailored or adapted to the particular request of the user 401 particularly asking why "application 1" was selected. Based on the additional data, the automated assistant can cause additional synthesized speech 458B1 of "You share your application usage with me, and it looks like you use application 1 the most for listening to music" to be provided for audible presentation to the user 401 via speaker(s) of the client device 410. In some implementations, the automated assistant can optionally cause a prompt 458B2 (e.g., determined based on recommendation data) of, for example, "Would you prefer me to do something else?" to be provided for audible presentation to the user 401 via speaker(s) of the client device 410 that requests the user 401 to provide a further additional spoken utterance if the user 401 would prefer the automated assistant to perform some alternate fulfillment candidate, such as requesting the user 401 provide a further additional spoken utterance 460B of "Use application 2, but only for rock music". Similar to described above with respect to FIG. 4A, the further additional spoken utterance 460B may implicitly grant the automated assistant access to "application 2" to be utilized responsive to the spoken utterance 452B and future instances of spoken utterances that include an assistant command for the automated assistant to play rock music.

Referring specifically to FIG. 4C, and in contrast with FIGS. 4A and 4B, again assume the user provides the same spoken utterance 452C of "Assistant, play rock music". However, in the example of FIG. 4C, assume the user 401 has not granted the automated assistant access to any software applications or services (e.g., streaming services implemented by one or more of the first-party server(s) 191 of FIG. 1 and/or the third-party server(s) 192 of FIG. 1) capable of playing music. Accordingly, any fulfillment candidates, included in the one or more fulfillment candidates, associated with, "application 1", "application 2", or any other software application or service may be associated with null fulfillment candidates. Nonetheless, in an attempt to satisfy the spoken utterance 452C, the automated assistant may transmit a structured request to, for example, a web browser to obtain content that is responsive to the spoken utterance 452C, such as a search result for "rock music", to avoid wasting computational resources for the interaction. As shown in FIG. 4C, the automated assistant can cause synthesized speech 454C of "Rock music is a broad genre of popular music that originated as 'rock and roll' . . . " to be provided for audible presentation to the user 401 via the speaker(s) of the client device 410.

However, further assume the user 401 provides an additional spoken utterance 456C of "Why didn't you play music?". In response to receiving the additional spoken utterance 456C, the automated assistant can cause audio data that captures the additional spoken utterance 456C to be processed, using the ASR model(s), to generate the ASR output in the same or similar manner described above with respect to processing the spoken utterance 452A in FIG. 4A. Further, the ASR output can be processed, using the NLU model(s), to generate NLU output in the same or similar manner described above with respect to processing the spoken utterance 452A in FIG. 4A. The automated assistant can determine, based on the ASR output and/or the NLU output, whether the additional spoken utterance 456C includes a request for the automated assistant to provide certain reasoning with respect to why certain fulfillment of the assistant command included in the spoken utterance 452A was performed. Notably, in the example of FIG. 4C, rather than the user 401 inquiring as to why the automated assistant caused certain fulfillment to be performed, the user 401 is inquiring as to why the automated assistant did not cause the certain fulfillment to be performed.

Accordingly, in the example of FIG. 4C, the automated assistant may determine, based on the ASR output and/or the NLU output generated based on processing the additional spoken utterance 456A, that the request for the certain reasoning is a particular request since the user is inquiring about a particular aspect of the certain fulfillment (e.g., why the automated didn't play any music). Accordingly, the automated assistant can obtain metadata associated with one or more of the alternate fulfillment candidates that were not selected to determine the additional data to be utilized in generating output responsive to the additional spoken utterance 456C. Notably, in the example of FIG. 4C, the additional data may differ from the additional data in the examples of FIGS. 4A and 4B in that the additional data utilized in the example of FIG. 4C can be tailored or adapted to the particular request of the user 401 particularly asking why music was not played. Based on the additional data, the automated assistant can cause additional synthesized speech 458C1 of "You have not granted me access to any applications or services that I can use to play music" to be provided for audible presentation to the user 401 via the speaker(s) of the client device 410. In some implementations, the automated assistant can optionally cause a prompt 458C2 (e.g., determined based on recommendation data) of, for example, "Would you like to grant me permission to an application or service?" to be provided for audible presentation to the user 401 via the speaker(s) of the client device 410 that requests the user 401 to provide a further additional spoken utterance if the user 401 would like to enable use of one or more software applications or services to play music, such as requesting the user 401 provide a further additional spoken utterance 460C of "Yes, use application 2, but only for rock music". In the example of FIG. 4C, the further additional spoken utterance 460C may explicitly grant the automated assistant access to "application 2" to be utilized responsive to the spoken utterance 452C and future instances of spoken utterances that include an assistant command for the automated assistant to play rock music.

Figure 5A:
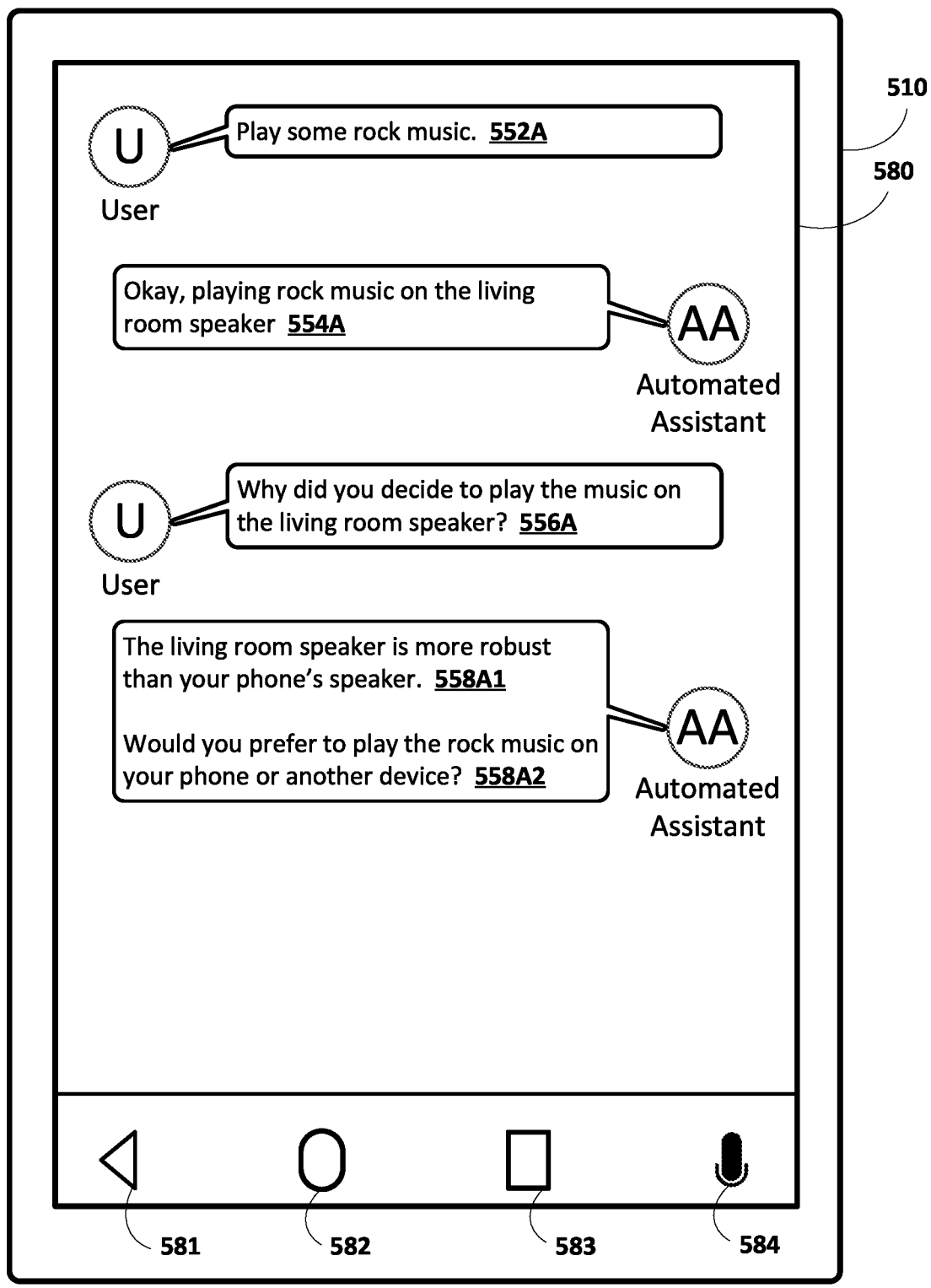
FIG. 5A and FIG. 5B depict various additional non-limiting examples of causing certain reasoning with respect to fulfillment of an assistant command to be provided, in accordance with various implementations.
Figure 5B:
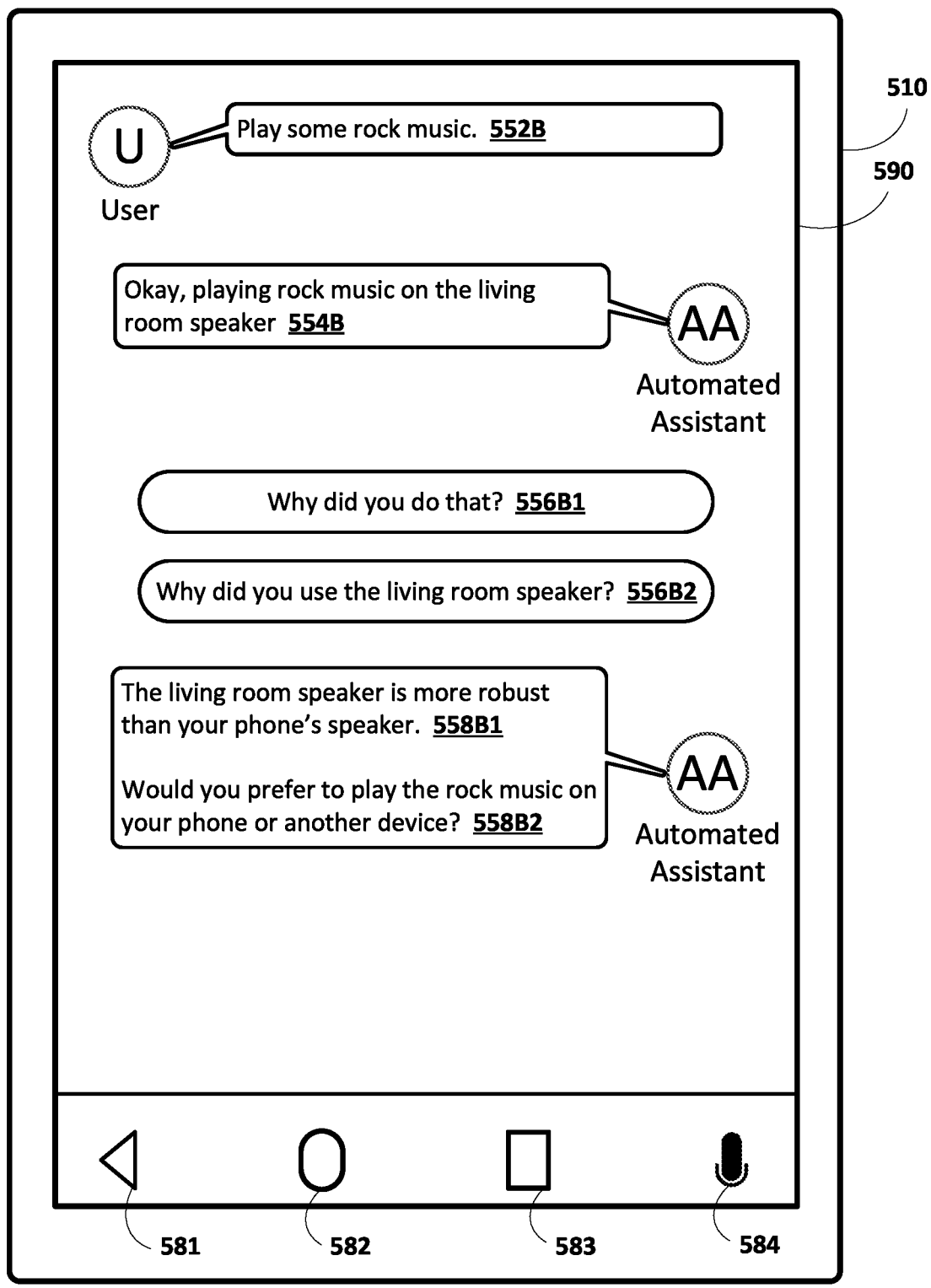

Turning now to FIGS. 5A-5B various additional non-limiting examples of causing certain reasoning with respect to the fulfillment of an assistant command to be provided are depicted. A client device 510 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 580 to visually render visual output. Further, the display 580 of the client device 510 can include various system interface elements 581, 582, and 583 (e.g., hardware and/or software interface elements) that may be interacted with by a user of the client device 510 to cause the client device 510 to perform one or more actions. The display 580 of the client device 510 enables the user to interact with content rendered on the display 580 by touch input (e.g., by directing user input to the display 580 or portions thereof (e.g., to a text entry box (not depicted), to a keyboard (not depicted), or to other portions of the display 580)) and/or by spoken input (e.g., by selecting microphone interface element 584—or just by speaking without necessarily selecting the microphone interface element 584 (i.e., an automated assistant may monitor for one or more terms or phrases, gesture(s) gaze(s), mouth movement(s), lip movement(s), and/or other conditions to activate spoken input) at the client device 510). Although the client device 510 depicted in FIGS. 5A-5B is a mobile phone, it should be understood that is for the sake of example and is not meant to be limiting. For example, the client device 510 may be a standalone speaker with a display, a standalone speaker without a display (e.g., as described with respect to FIGS. 4A-4C), a home automation device, an in-vehicle system, a laptop, a desktop computer, and/or any other device capable of executing an automated assistant to engage in a human-to-computer dialog session with the user of the client device 510.

Referring specifically to FIG. 5A, assume a user of the client device 510 provides a spoken utterance 552A of "Play some rock music." In response to receiving the spoken utterance 552A, the automated assistant can cause audio data that captures the spoken utterance 552A to be processed, using ASR model(s), to generate ASR output, cause the ASR output to be processed, using NLU model(s), to generate NLU output, and cause the NLU output to be processed, using fulfillment rule(s) and/or fulfillment model(s), to generate fulfillment output in the same or similar manner. Further assume that the automated assistant determines the client device 510 of the user is communicatively coupled with a smart speaker (e.g., a living room speaker) that has a more robust speaker than the client device 510 and that is capable of playing the rock music. Accordingly, based on processing the spoken utterance 552A, the automated assistant may determine to cause the rock music to be played at the living room speaker and cause synthesized speech 554A of "Okay, playing rock music on the living room speaker" to be provided for audible presentation to the user via speaker(s) of the client device 510 and/or for visual presentation to the user via the display 580 of the client device 510, and cause the rock music to be played on the living room speaker.

However, further assume the user of the client device 510 provides an additional spoken utterance 556A of "Why did you decide to play the music on the living room speaker?". In this example, the automated assistant may determine, based on ASR output and/or NLU output generated based on processing the additional spoken utterance 556A, that a request for a certain reasoning is included in the additional spoken utterance and that the request is a particular request since the user is inquiring about a particular aspect of the certain fulfillment (e.g., why the automated assistant selected "living room speaker" to play the rock music). In this example, the automated assistant can obtain metadata associated with a selected fulfillment candidate to determine additional data to be utilized in providing the certain reasoning as to why the automated assistant decided to play the music on the living room speaker, rather than at the client device 510 or another computing device that is communicatively coupled to the client device 510 and capable of playing music (e.g., a kitchen speaker, a den speaker, etc.). Based on the additional data, the automated assistant can cause additional synthesized speech 558A1 of "The living room speaker is more robust than your phone's speaker" (and optionally based on detected presence of the user of the client device 510 in the living room (e.g., via the presence sensor(s) 111 of the client device 110 of FIG. 1)) to be provided for audible presentation to the user via the speaker(s) of the client device 510 and/or for visual presentation to the user via the display 580 of the client device 510. In some implementations, the automated assistant can optionally cause a prompt 558A2 (e.g., determined based on recommendation data) of, for example, "Would you prefer me to play the rock music on your phone or another device?" to be provided for audible presentation to the user via the speaker(s) of the client device 510 and/or for visual presentation to the user via the display 580 of the client device 510 that requests the user to provide a further additional spoken utterance if the user would prefer the automated assistant to perform some alternate fulfillment candidate, such as using the client device 510 to play the rock music, using a different software application accessible by the client device 510 to play the music, causing the automated assistant to switch artists/songs, etc. If the user provides any further input, then the automated assistant can adapt playback of the music accordingly.

In additional or alternative implementations, and in contrast with waiting for the user of the client device 510 to provide any additional user input 556A that includes the request for the certain reasoning, the automated assistant can proactively provide one or more selectable elements associated with the certain reasoning. For example, and referring specifically to FIG. 5B, again assume the user of the client device 510 provides a spoken utterance 552B of "Play some rock music." In response to receiving the spoken utterance 552B, the automated assistant can cause audio data that captures the spoken utterance 552B to be processed, using ASR model(s), to generate ASR output, cause the ASR output to be processed, using NLU model(s), to generate NLU output, and cause the NLU output to be processed, using fulfillment rule(s) and/or fulfillment model(s), to generate fulfillment output in the same or similar manner. Again, further assume that the automated assistant determines the client device 510 of the user is communicatively coupled with a smart speaker (e.g., a living room speaker) that has a more robust speaker than the client device 510 and that is capable of playing the rock music. Accordingly, based on processing the spoken utterance 552B, the automated assistant may determine to cause the rock music to be played at the living room speaker and cause synthesized speech 554B of "Okay, playing rock music on the living room speaker" to be provided for audible presentation to the user via speaker(s) of the client device 510 and/or for visual presentation to the user via the display 580 of the client device 510, and cause the rock music to be played on the living room speaker.

However, in the example of FIG. 5B, further assume that the automated assistant proactively provides one or more selectable elements associated with the certain reasoning without the user of the client device 510 providing any additional spoken utterances or other user input. For example, and as shown in FIG. 5B, the automated assistant can cause a first selectable element 556B1 of "Why did you do that?" that is associated with a general request as to why the automated assistant caused the certain fulfillment of the assistant command to be performed generally and/or a second selectable element 556B2 of "Why did you use the living room speaker?" that is associated with a particular request as to why the automated assistant caused the certain fulfillment of the assistant command to be performed using the living room speaker. In response to a user selection (e.g., via touch input or spoken input), from the user of the client device, of the first selectable element 556B1, the automated assistant can obtain metadata associated with the certain fulfillment of the assistant command based on the user selection (e.g., a user selection of the first selectable element 556B1 or a user selection of the second selectable element 556B2) to determine additional data to be utilized in providing the certain reasoning. For instance, in response to receiving a user selection of the first selectable element 556B1, the automated assistant can determine additional data as to why the automated assistant decided to select a particular application to play rock music (e.g., "application 1" vs. "application 2" as described above with respect to FIGS. 4A-4C), select a certain artist (e.g., as described above with respect to FIGS. 4A-4C), select a certain song by the certain artist (e.g., as described above with respect to FIGS. 4A-4C), play the music on the living room speaker, (e.g., as described above with respect to FIGS. 5A), and/or certain reasoning with respect to any other aspect of the certain fulfillment. Also, for instance, in response to receiving a user selection of the second selectable element 556B2, the automated assistant can determine additional data as to why the automated assistant decided to play the music on the living room speaker, rather than at the client device 510 or another computing device that is communicatively coupled to the client device 510 and capable of playing music (e.g., a kitchen speaker, a den speaker, etc.).

For example, in the example of FIG. 5B, assume the user of the client device 510 provides a user selection of the second selectable element 556B2. Based on the additional data determined based on the user selection of the second selectable element 556B2, the automated assistant can cause additional synthesized speech 558B1 of "The living room speaker is more robust than your phone's speaker" (and optionally based on detected presence of the user of the client device 510 in the living room (e.g., via the presence sensor(s) 111 of the client device 110 of FIG. 1)) to be provided for audible presentation to the user via the speaker(s) of the client device 510 and/or for visual presentation to the user via the display 580 of the client device 510. In some implementations, the automated assistant can optionally cause a prompt 558B2 (e.g., determined based on recommendation data) of, for example, "Would you prefer me to play the rock music on your phone or another device?" to be provided for audible presentation to the user via the speaker(s) of the client device 510 and/or for visual presentation to the user via the display 580 of the client device 510 that requests the user to provide a further additional spoken utterance if the user would prefer the automated assistant to perform some alternate fulfillment candidate, such as using the client device 510 to play the rock music, using a different software application accessible by the client device 510 to play the music, causing the automated assistant to switch artists/songs, etc. If the user provides any further input, then the automated assistant can adapt playback of the music accordingly.

Although the above examples of FIGS. 4A-4C and 5A-5B are described with respect to causing an automated assistant to perform fulfillment based on particular spoken utterances for a media application or media service, and providing certain reasoning for fulfillment in response to additional particular spoken utterances, it should be understood that is for the sake of example and is not meant to be limiting. For example, the techniques described herein can be utilized to provide certain reasoning for any aspect of any fulfillment performed by an automated assistant and/or with respect to any fulfillment candidate that is selected or not selected by the automated assistant. Moreover, although the above examples of FIGS. 4A-4C and 5A-5B are described with respect to providing certain recommended actions determined based on certain recommendation data (e.g., granting the automated assistant access to particular software applications for playing media), it should be understood that is also for the sake of example and is not meant to be limiting. As some non-limiting examples, the recommended actions described herein can include granting the automated assistant access to any software application, any user account, any computing device that is associated with the user, historical query activity, and/or any other user data that can be leveraged by the automated assistant in determining how to fulfill any assistant command.

Figure 6:
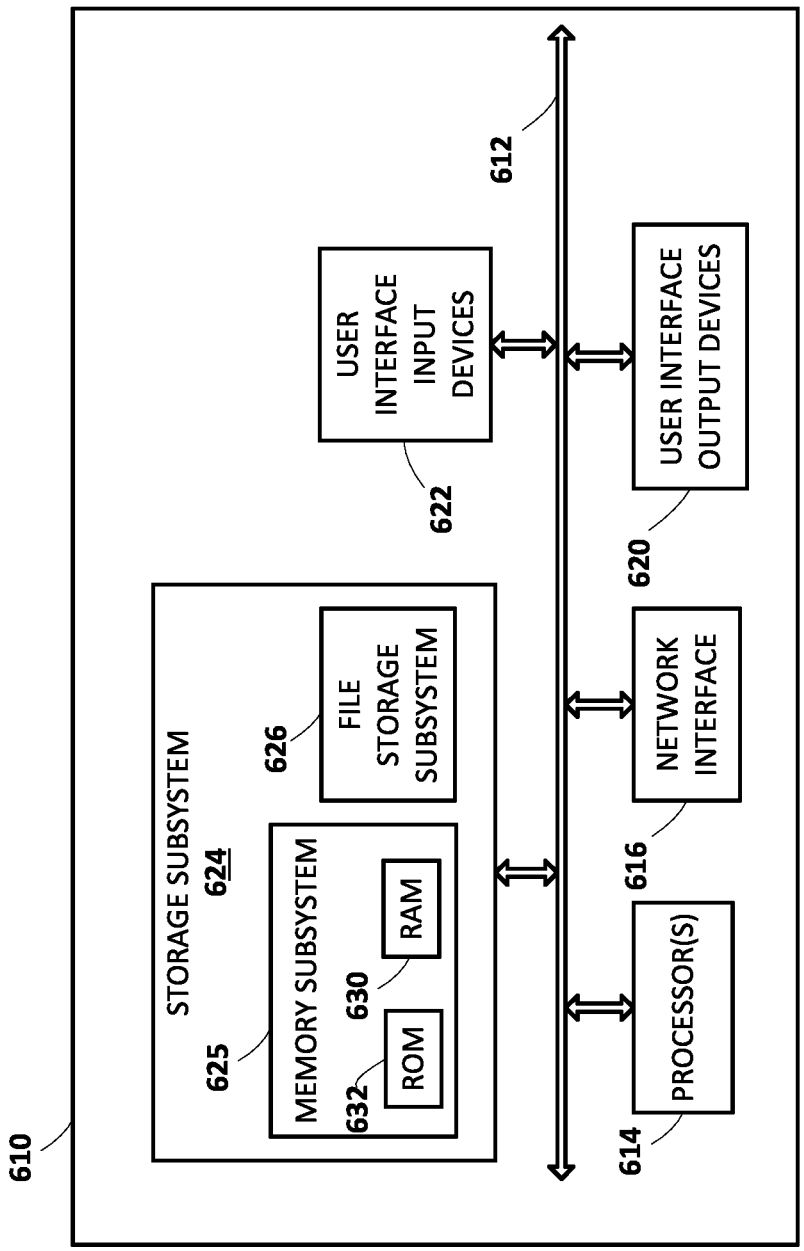
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/ or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a user of a client device, user input that includes an assistant command and that is directed to an automated assistant executing at least in part at the client device; processing the user input to determine data to be utilized in performance of certain fulfillment of the assistant command; causing the automated assistant to utilize the data to perform the certain fulfillment of the assistant command; receiving, from the user of the client device, additional user input that includes a request for the automated assistant to provide a certain reasoning with respect to why the automated assistant performed the certain fulfillment of the assistant command; processing the additional user input to determine additional data to be utilized in providing the certain reasoning with respect to why the automated assistant performed the certain fulfillment of the assistant command; and causing the automated assistant to utilize the additional data to provide, for presentation to the user of the client device, output that includes the certain reasoning with respect to why the automated assistant performed the certain fulfillment of the assistant command.

These and other implementations of technology disclosed herein can optionally include one or more of the following features.

In some implementations, the user input that includes the assistant command and that is directed to the automated assistant may be captured in audio data generated by one or more microphones of the client device. In some versions of those implementations, processing the user input to determine the data to be utilized in performance of the certain fulfillment of the assistant command may include processing, using an automatic speech recognition (ASR) model, the audio data that capturing the user input that includes the assistant command to generate ASR output; processing, using a natural language understanding (NLU) model, the ASR output to generate NLU output; and determining the data to be utilized in performance of the certain fulfillment of the assistant command based on the NLU output.

In some implementations, the user input that includes the assistant command directed to the automated assistant may be captured in typed input detected via a display of the client device. In some versions of those implementations, processing the user input to determine the data to be utilized in performance of the certain fulfillment of the assistant command may include processing, using a natural language understanding (NLU) model, the typed input to generate NLU output; and generating the data to be utilized in performance of the certain fulfillment of the assistant command based on the NLU output.

In some implementations, the request for the automated assistant to provide the certain reasoning with respect to why the automated assistant performed the certain fulfillment of the assistant command may include a particular request for the automated assistant to provide the certain reasoning with respect to why the automated assistant selected a particular software application, from among a plurality of disparate software applications, utilized in performing the certain fulfillment. In some versions of those implementations, processing the additional user input to determine the additional data to be utilized in providing the certain reasoning with respect to why the automated assistant performed the certain fulfillment of the assistant command may include obtaining metadata associated with the particular software application utilized in performing the certain fulfillment; and determining, based on the metadata associated with the particular software application, the additional data to be utilized in providing the certain reasoning with respect to why the automated assistant performed the certain fulfillment of the assistant command.

In some implementations, the request for the automated assistant to provide the certain reasoning with respect to why the automated assistant performed the certain fulfillment of the assistant command may include a particular request for the automated assistant to provide the certain reasoning with respect to why the automated assistant selected a particular interpretation of the user input, from among a plurality of disparate interpretations of the user input, utilized in performing the certain fulfillment. In some versions of those implementations, processing the additional user input to determine the additional data to be utilized in providing the certain reasoning with respect to why the automated assistant performed the certain fulfillment of the assistant command may include obtaining metadata associated with the particular interpretation of the user input utilized in performing the certain fulfillment; and determining, based on the metadata associated with the particular interpretation of the user input, the additional data to be utilized in providing the certain reasoning with respect to why the automated assistant performed the certain fulfillment of the assistant command.

In some implementations, the request for the automated assistant to provide the certain reasoning with respect to why the automated assistant performed the certain fulfillment of the assistant command may include a particular request for the automated assistant to provide the certain reasoning with respect to why the automated assistant selected an additional client device of the user, in lieu of the client device of the user, utilized in performing the certain fulfillment. In some versions of those implementations, processing the additional user input to determine the additional data to be utilized in providing the certain reasoning with respect to why the automated assistant performed the certain fulfillment of the assistant command may include obtaining metadata associated with the additional client device utilized in performing the certain fulfillment; and determining, based on the metadata associated with the additional client device, the additional data to be utilized in providing the certain reasoning with respect to why the automated assistant performed the certain fulfillment of the assistant command.

In some implementations, the request for the automated assistant to provide the certain reasoning with respect to why the automated assistant performed the certain fulfillment of the assistant command may include a general request for the automated assistant to provide the certain reasoning with respect to why the automated assistant performed the certain fulfillment. In some versions of those implementations, processing the additional user input to determine the additional data to be utilized in providing the certain reasoning with respect to why the automated assistant performed the certain fulfillment of the assistant command may include obtaining corresponding metadata associated with one or more of: (i) a particular software application, from among a plurality of disparate software applications, utilized in performing the certain fulfillment, (ii) a particular interpretation of the user input, from among a plurality of disparate interpretations of the user input, utilized in performing the certain fulfillment, or (iii) an additional client device of the user, in lieu of the client device of the user, utilized in performing the certain fulfillment; and determining, based on the corresponding metadata, the additional data to be utilized in providing the certain reasoning with respect to why the automated assistant performed the certain fulfillment of the assistant command.

In some implementations, causing the automated assistant to utilize the additional data to provide, for presentation to the user of the client device, the output that includes the certain reasoning with respect to why the automated assistant performed the certain fulfillment of the assistant command may include processing, using a text-to-speech (TTS) model, the additional data to generate synthesized speech audio data that includes synthesized speech corresponding to the certain reasoning with respect to why the automated assistant performed the certain fulfillment of the assistant command.

In some implementations, causing the automated assistant to utilize the additional data to provide, for presentation to the user of the client device, the output that includes the certain reasoning with respect to why the automated assistant performed the certain fulfillment of the assistant command may include causing the output that includes the certain reasoning with respect to why the automated assistant performed the certain fulfillment of the assistant command to be visually rendered at a display of the client device.

In some implementations, processing the additional user input to determine the additional data to be utilized in providing the certain reasoning with respect to why the automated assistant performed the certain fulfillment of the assistant command may include selecting, based on the request included in the additional user input, and from among a plurality of disparate instances of pre-generated data, the additional data.

In some implementations, processing the additional user input to determine the additional data to be utilized in providing the certain reasoning with respect to why the automated assistant performed the certain fulfillment of the assistant command may include generating, based on the request included in the additional user input, the additional data.

In some implementations, a method implemented by one or more processors is provided, and includes receiving, from a user of a client device, user input that includes an assistant command and that is directed to an automated assistant executing at least in part at the client device; determining whether data to be utilized in performance of certain fulfillment of the assistant command can be determined; in response to determining that the data to be utilized in performance of the certain fulfillment of the assistant command cannot be determined: processing the user input to determine alternate data to be utilized in performance of alternate fulfillment of the assistant command; and causing the automated assistant to utilize the alternate data to perform the alternate fulfillment of the assistant command; receiving, from the user of the client device, additional user input that includes a request for the automated assistant to provide a certain reasoning with respect to why the automated assistant performed the alternate fulfillment of the assistant command in lieu of the certain fulfillment of the assistant command; processing the additional user input to determine additional data to be utilized in providing the certain reasoning with respect to why the automated assistant performed the alternate fulfillment of the assistant command in lieu of the certain fulfillment of the assistant command; and causing the automated assistant to utilize the additional data to provide, for presentation to the user of the client device, output that includes the certain reasoning with respect to why the automated assistant performed the alternate fulfillment of the assistant command in lieu of the certain fulfillment of the assistant command.

These and other implementations of technology disclosed herein can optionally include one or more of the following features.

In some implementations, processing the additional user input to determine the additional data to be utilized in providing the certain reasoning with respect to why the automated assistant performed the alternate fulfillment of the assistant command in lieu of the certain fulfillment of the assistant command further may include processing the additional user input to generate recommendation data to be utilized in generating a recommended action with respect to how the automated assistant can perform the certain fulfillment of the assistant command. In some versions of those implementations, the output may further include the recommended action with respect to how the automated assistant can enable the certain fulfillment of the assistant command. In some further versions of those implementations, the recommended action may include a prompt that, when selected, causes the automated assistant to perform the recommended action.

In some implementations, a method implemented by one or more processors is provided, and includes receiving, from a user of a client device, user input that includes an assistant command and that is directed to an automated assistant executing at least in part at the client device; determining whether data to be utilized in performance of certain fulfillment of the assistant command can be determined; in response to determining that the data to be utilized in performance of the certain fulfillment of the assistant command cannot be determined: processing the user input to determine recommendation data to be utilized in generating a recommended action with respect to how the automated assistant can perform the certain fulfillment of the assistant command; and causing the automated assistant to utilize the recommendation data to provide, for presentation to the user of the client device, output that includes the recommended action with respect to how the automated assistant can enable the certain fulfillment of the assistant command, and that includes a prompt that, when selected, causes the automated assistant to perform the recommended action; and in response to receiving, from the user of the client device, additional user input that includes a user selection of the prompt: causing the automated assistant to perform the recommended action to enable performance of the certain fulfillment of the assistant command.

These and other implementations of technology disclosed herein can optionally include one or more of the following features.

In some implementations, processing the user input to determine the recommendation data to be utilized in generating the recommended action with respect to how the automated assistant can perform the certain fulfillment of the assistant command may be in response to determining that there is no alternate fulfillment of the assistant command.

In some implementations, a method implemented by one or more processors is provided, and includes receiving, from a user of a client device, user input that includes an assistant command and that is directed to an automated assistant executing at least in part at the client device; processing the user input to determine data to be utilized in performance of certain fulfillment of the assistant command; causing the automated assistant to utilize the data to perform the certain fulfillment of the assistant command; receiving, from the user of the client device, additional user input that includes a request for the automated assistant to provide a certain reasoning with respect to why the automated assistant did not perform alternate fulfillment of the assistant command in lieu of the certain fulfillment of the assistant command; processing the additional user input to determine additional data to be utilized in providing the certain reasoning with respect to why the automated assistant did not perform the alternate fulfillment of the assistant command in lieu of the certain fulfillment of the assistant command; and causing the automated assistant to utilize the additional data to provide, for presentation to the user of the client device, output that includes the certain reasoning with respect to why the automated assistant did not perform the alternate fulfillment of the assistant command in lieu of the certain fulfillment of the assistant command.

In some implementations, a method implemented by one or more processors is provided, and includes receiving, from a user of a client device, user input that includes an assistant command and that is directed to an automated assistant executing at least in part at the client device; processing the user input to determine data to be utilized in performance of certain fulfillment of the assistant command; causing the automated assistant to utilize the data to perform the certain fulfillment of the assistant command; while the automated assistant performs the certain fulfillment of the assistant command: causing the automated assistant to visually render, for presentation to the user of the client device, a selectable element that, when selected, causes the automated assistant to provide a certain reasoning with respect to why the automated assistant performed the certain fulfillment of the assistant command; and in response to receiving, from the user of the client device, additional user input that includes a user selection of the selectable element: processing the additional user input to determine additional data to be utilized in providing the certain reasoning with respect to why the automated assistant did not perform the alternate fulfillment of the assistant command in lieu of the certain fulfillment of the assistant command; and causing the automated assistant to provide, for presentation to the user of the client device, output that includes the certain reasoning with respect to why the automated assistant performed the certain fulfillment of the assistant command.

These and other implementations of technology disclosed herein can optionally include one or more of the following features.

In some implementations, the user input that includes the assistant command directed to the automated assistant may be captured in audio data generated by one or more microphones of the client device. In some versions of those implementations, processing the user input to determine the data to be utilized in performance of the certain fulfillment of the assistant command may include processing, using an automatic speech recognition (ASR) model, the audio data that capturing the user input that includes the assistant command to generate ASR output; processing, using a natural language understanding (NLU) model, the ASR output to generate NLU output; and determining the data to be utilized in performance of the certain fulfillment of the assistant command based on the NLU output. In some further versions of those implementations, causing the automated assistant to visually render, for presentation to the user of the client device, the selectable element that, when selected, causes the automated assistant to provide the certain reasoning with respect to why the automated assistant performed the certain fulfillment of the assistant command may be in response to determining that an NLU metric associated with the NLU output fails to satisfy an NLU metric threshold.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   receiving, from a user of a client device, user input that includes an assistant command and that is directed to an automated assistant executing at least in part at the client device;
   processing the user input to determine data to be utilized in performance of certain fulfillment of the assistant command;
   causing the automated assistant to utilize the data to perform the certain fulfillment of the assistant command;
   receiving, from the user of the client device, additional user input that includes a request for the automated assistant to provide a certain reasoning with respect to why the automated assistant performed the certain fulfillment of the assistant command, wherein the request for the automated assistant to provide the certain reasoning with respect to why the automated assistant performed the certain fulfillment of the assistant command includes a particular request for the automated assistant to provide the certain reasoning with respect to why the automated assistant:
     selected a particular software application, from among a plurality of disparate software applications, utilized in performing the certain fulfillment, or
     selected an additional client device of the user, in lieu of the client device of the user, utilized in performing the certain fulfillment;
   processing the additional user input to determine additional data to be utilized in providing the certain reasoning with respect to why the automated assistant performed the certain fulfillment of the assistant command; and
   causing the automated assistant to utilize the additional data to provide, for presentation to the user of the client device, output that includes the certain reasoning with respect to why the automated assistant performed the certain fulfillment of the assistant command.

2. The method of claim 1, wherein the user input that includes the assistant command and that is directed to the automated assistant is captured in audio data generated by one or more microphones of the client device.

3. The method of claim 2, wherein processing the user input to determine the data to be utilized in performance of the certain fulfillment of the assistant command comprises:
processing, using an automatic speech recognition (ASR) model, the audio data that capturing the user input that includes the assistant command to generate ASR output;
processing, using a natural language understanding (NLU) model, the ASR output to generate NLU output; and
determining the data to be utilized in performance of the certain fulfillment of the assistant command based on the NLU output.

4. The method of claim 1, wherein the user input that includes the assistant command directed to the automated assistant is captured in typed input detected via a display of the client device.

5. The method of claim 4, wherein processing the user input to determine the data to be utilized in performance of the certain fulfillment of the assistant command comprises:
processing, using a natural language understanding (NLU) model, the typed input to generate NLU output; and
generating the data to be utilized in performance of the certain fulfillment of the assistant command based on the NLU output.

6. The method of claim 1, wherein the request for the automated assistant to provide the certain reasoning with respect to why the automated assistant performed the certain fulfillment of the assistant command includes the particular request for the automated assistant to provide the certain reasoning with respect to why the automated assistant selected the particular software application, from among the plurality of disparate software applications, utilized in performing the certain fulfillment.

7. The method of claim 6, wherein processing the additional user input to determine the additional data to be utilized in providing the certain reasoning with respect to why the automated assistant performed the certain fulfillment of the assistant command comprises:
obtaining metadata associated with the particular software application utilized in performing the certain fulfillment; and
determining, based on the metadata associated with the particular software application, the additional data to be utilized in providing the certain reasoning with respect to why the automated assistant performed the certain fulfillment of the assistant command.

8. The method of claim 1, wherein the request for the automated assistant to provide the certain reasoning with respect to why the automated assistant performed the certain fulfillment of the assistant command includes the particular request for the automated assistant to provide the certain reasoning with respect to why the automated assistant selected the additional client device of the user, in lieu of the client device of the user, utilized in performing the certain fulfillment.

9. The method of claim 8, wherein processing the additional user input to determine the additional data to be utilized in providing the certain reasoning with respect to why the automated assistant performed the certain fulfillment of the assistant command comprises:
obtaining metadata associated with the additional client device utilized in performing the certain fulfillment; and
determining, based on the metadata associated with the additional client device, the additional data to be utilized in providing the certain reasoning with respect to why the automated assistant performed the certain fulfillment of the assistant command.

10. The method of claim 1, wherein causing the automated assistant to utilize the additional data to provide, for presentation to the user of the client device, the output that includes the certain reasoning with respect to why the automated assistant performed the certain fulfillment of the assistant command comprises:
processing, using a text-to-speech (TTS) model, the additional data to generate synthesized speech audio data that includes synthesized speech corresponding to the certain reasoning with respect to why the automated assistant performed the certain fulfillment of the assistant command.

11. The method of claim 1, wherein causing the automated assistant to utilize the additional data to provide, for presentation to the user of the client device, the output that includes the certain reasoning with respect to why the automated assistant performed the certain fulfillment of the assistant command comprises:
causing the output that includes the certain reasoning with respect to why the automated assistant performed the certain fulfillment of the assistant command to be visually rendered at a display of the client device.

12. A system comprising:
at least one processor; and
memory storing instructions that, when executed, cause the at least one processor to be operable to:
receive, from a user of a client device, user input that includes an assistant command and that is directed to an automated assistant executing at least in part at the client device;
process the user input to determine data to be utilized in performance of certain fulfillment of the assistant command;
cause the automated assistant to utilize the data to perform the certain fulfillment of the assistant command;
receive, from the user of the client device, additional user input that includes a request for the automated assistant to provide a certain reasoning with respect to why the automated assistant performed the certain fulfillment of the assistant command, wherein the request for the automated assistant to provide the certain reasoning with respect to why the automated assistant performed the certain fulfillment of the assistant command includes a particular request for the automated assistant to provide the certain reasoning with respect to why the automated assistant:
selected a particular software application, from among a plurality of disparate software applications, utilized in performing the certain fulfillment, or
selected an additional client device of the user, in lieu of the client device of the user, utilized in performing the certain fulfillment;
process the additional user input to determine additional data to be utilized in providing the certain reasoning with respect to why the automated assistant performed the certain fulfillment of the assistant command; and
cause the automated assistant to utilize the additional data to provide, for presentation to the user of the client device, output that includes the certain reasoning with respect to why the automated assistant performed the certain fulfillment of the assistant command.

13. The system of claim 12, wherein the user input that includes the assistant command and that is directed to the automated assistant is captured in audio data generated by one or more microphones of the client device.

14. The system of claim 12, wherein the request for the automated assistant to provide the certain reasoning with respect to why the automated assistant performed the certain fulfillment of the assistant command includes the particular request for the automated assistant to provide the certain reasoning with respect to why the automated assistant selected the particular software application, from among the plurality of disparate software applications, utilized in performing the certain fulfillment.

15. The system of claim 14, wherein the instructions to process the additional user input to determine the additional data to be utilized in providing the certain reasoning with respect to why the automated assistant performed the certain fulfillment of the assistant command comprise instructions to:
 obtain metadata associated with the particular software application utilized in performing the certain fulfillment; and
 determine, based on the metadata associated with the particular software application, the additional data to be utilized in providing the certain reasoning with respect to why the automated assistant performed the certain fulfillment of the assistant command.

16. The system of claim 12, wherein the request for the automated assistant to provide the certain reasoning with respect to why the automated assistant performed the certain fulfillment of the assistant command includes the particular request for the automated assistant to provide the certain reasoning with respect to why the automated assistant selected the additional client device of the user, in lieu of the client device of the user, utilized in performing the certain fulfillment.

17. The system of claim 16, wherein the instructions to process the additional user input to determine the additional data to be utilized in providing the certain reasoning with respect to why the automated assistant performed the certain fulfillment of the assistant command comprise instructions to:
 obtain metadata associated with the additional client device utilized in performing the certain fulfillment; and
 determine, based on the metadata associated with the additional client device, the additional data to be utilized in providing the certain reasoning with respect to why the automated assistant performed the certain fulfillment of the assistant command.

18. A non-transitory computer-readable storage medium storing instructions that, when executed, cause one or more processors to be operable to perform operations, the operations comprising:
 receiving, from a user of a client device, user input that includes an assistant command and that is directed to an automated assistant executing at least in part at the client device;
 processing the user input to determine data to be utilized in performance of certain fulfillment of the assistant command;
 causing the automated assistant to utilize the data to perform the certain fulfillment of the assistant command;
 receiving, from the user of the client device, additional user input that includes a request for the automated assistant to provide a certain reasoning with respect to why the automated assistant performed the certain fulfillment of the assistant command, wherein the request for the automated assistant to provide the certain reasoning with respect to why the automated assistant performed the certain fulfillment of the assistant command includes a particular request for the automated assistant to provide the certain reasoning with respect to why the automated assistant:
  selected a particular software application, from among a plurality of disparate software applications, utilized in performing the certain fulfillment, or
  selected an additional client device of the user, in lieu of the client device of the user, utilized in performing the certain fulfillment;
 processing the additional user input to determine additional data to be utilized in providing the certain reasoning with respect to why the automated assistant performed the certain fulfillment of the assistant command; and
 causing the automated assistant to utilize the additional data to provide, for presentation to the user of the client device, output that includes the certain reasoning with respect to why the automated assistant performed the certain fulfillment of the assistant command.

19. The non-transitory computer-readable storage medium of claim 18,
 wherein the request for the automated assistant to provide the certain reasoning with respect to why the automated assistant performed the certain fulfillment of the assistant command includes the particular request for the automated assistant to provide the certain reasoning with respect to why the automated assistant selected the particular software application, from among the plurality of disparate software applications, utilized in performing the certain fulfillment, and
 wherein processing the additional user input to determine the additional data to be utilized in providing the certain reasoning with respect to why the automated assistant performed the certain fulfillment of the assistant command comprises:
  obtaining metadata associated with the particular software application utilized in performing the certain fulfillment; and
  determining, based on the metadata associated with the particular software application, the additional data to be utilized in providing the certain reasoning with respect to why the automated assistant performed the certain fulfillment of the assistant command.

20. The non-transitory computer-readable storage medium of claim 18,
 wherein the request for the automated assistant to provide the certain reasoning with respect to why the automated assistant performed the certain fulfillment of the assistant command includes the particular request for the automated assistant to provide the certain reasoning with respect to why the automated assistant selected the additional client device of the user, in lieu of the client device of the user, utilized in performing the certain fulfillment; and
 wherein processing the additional user input to determine the additional data to be utilized in providing the certain reasoning with respect to why the automated assistant performed the certain fulfillment of the assistant command comprises:

obtaining metadata associated with the additional client device utilized in performing the certain fulfillment; and determining, based on the metadata associated with the additional client device, the additional data to be utilized in providing the certain reasoning with respect to why the automated assistant performed the certain fulfillment of the assistant command.

\* \* \* \* \*